US012617024B2

(12) United States Patent
Watanobe et al.

(10) Patent No.: US 12,617,024 B2
(45) Date of Patent: May 5, 2026

(54) CUTTING TOOL

(71) Applicant: SUMITOMO ELECTRIC HARDMETAL CORP., Hyogo (JP)

(72) Inventors: Naoki Watanobe, Hyogo (JP); Masashi Harada, Hyogo (JP); Takashi Harada, Hyogo (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 613 days.

(21) Appl. No.: 18/011,167

(22) PCT Filed: Jun. 18, 2021

(86) PCT No.: PCT/JP2021/023201
§ 371 (c)(1),
(2) Date: Dec. 17, 2022

(87) PCT Pub. No.: WO2021/261396
PCT Pub. Date: Dec. 30, 2021

(65) Prior Publication Data
US 2023/0241691 A1      Aug. 3, 2023

(30) Foreign Application Priority Data

Jun. 22, 2020    (WO) .................. PCT/JP2020/024453

(51) Int. Cl.
*B23B 27/14*          (2006.01)
(52) U.S. Cl.
CPC ...... *B23B 27/148* (2013.01); *B23B 2226/125* (2013.01); *B23B 2228/105* (2013.01)

(58) Field of Classification Search
None
See application file for complete search history.

(56) References Cited

U.S. PATENT DOCUMENTS

| | | | |
|---|---|---|---|
| 4,442,169 A | 4/1984 | Graham | |
| 5,467,670 A | 11/1995 | Alverio | |
| 6,337,152 B1 * | 1/2002 | Kukino | ................. C04B 41/009 |
| | | | 51/307 |
| 2001/0003569 A1 | 6/2001 | Ota et al. | |
| 2009/0067938 A1 | 3/2009 | Omori et al. | |
| 2009/0245946 A1 | 10/2009 | Maeda | |

(Continued)

FOREIGN PATENT DOCUMENTS

| | | |
|---|---|---|
| CN | 103958098 A | 7/2014 |
| CN | 105873701 A | 8/2016 |

(Continued)

*Primary Examiner* — David Sample
(74) *Attorney, Agent, or Firm* — Renner, Otto, Boisselle & Sklar, LLP

(57) ABSTRACT

A cutting tool according to the present disclosure has a rake face, a flank face, and a cutting edge. The cutting edge is located between the rake face and the flank face. The cutting tool includes a substrate composed of a cubic boron nitride sintered material, and an oxide layer that covers the substrate and that constitutes at least part or whole of the rake face, the flank face, and the cutting edge. The oxide layer includes at least one element selected from a group consisting of titanium, aluminum, zirconium, and cobalt. A thickness of the oxide layer is 2 μm or less.

11 Claims, 11 Drawing Sheets

(56)                    References Cited

U.S. PATENT DOCUMENTS

| | | | |
|---|---|---|---|
| 2011/0014426 A1 | 1/2011 | Ohtomo | |
| 2011/0020081 A1 | 1/2011 | Webb et al. | |
| 2012/0275870 A1 | 11/2012 | Paseuth et al. | |
| 2015/0003926 A1 | 1/2015 | Yano et al. | |
| 2015/0016902 A1 | 1/2015 | Okamura et al. | |
| 2016/0297010 A1 | 10/2016 | Kukino et al. | |
| 2017/0362130 A1 | 12/2017 | Hirano et al. | |
| 2019/0054545 A1 | 2/2019 | Harada et al. | |
| 2019/0134722 A1 | 5/2019 | Machii et al. | |
| 2020/0078868 A1 * | 3/2020 | Hirano | C23C 28/04 |
| 2020/0102638 A1 | 4/2020 | Schier et al. | |

FOREIGN PATENT DOCUMENTS

| | | | | | |
|---|---|---|---|---|---|
| CN | 107207362 | A | 9/2017 | | |
| CN | 110651063 | A | 1/2020 | | |
| EP | 2851148 | A1 | 3/2015 | | |
| JP | S60-024371 | A | 2/1985 | | |
| JP | S62-188306 | U | 11/1987 | | |
| JP | H06-206104 | A | 7/1994 | | |
| JP | H07-328831 | A | 12/1995 | | |
| JP | H10-118827 | A | 5/1998 | | |
| JP | H11-151603 | A | 6/1999 | | |
| JP | 2001-220268 | A | 8/2001 | | |
| JP | 2001-522725 | A | 11/2001 | | |
| JP | 2007-181896 | A | 7/2007 | | |
| JP | 2009-220259 | A | 10/2009 | | |
| JP | 2009-241190 | A | 10/2009 | | |
| JP | 2012-11471 | A | 1/2012 | | |
| JP | 2012-45686 | A | 3/2012 | | |
| JP | 2013-75357 | A | 4/2013 | | |
| JP | 2015-44259 | A | 3/2015 | | |
| JP | 2017-159380 | A | 9/2017 | | |
| JP | 2019-025615 | A | 2/2019 | | |
| WO | 1999/024634 | A1 | 5/1999 | | |
| WO | 2013/161558 | A1 | 10/2013 | | |
| WO | WO-2017094628 | A1 * | 6/2017 | ............ | C23C 28/40 |
| WO | 2017/188266 | A1 | 11/2017 | | |
| WO | 2018/116524 | A1 | 6/2018 | | |
| WO | 2018/155644 | A1 | 8/2018 | | |

* cited by examiner

CUTTING TOOL

TECHNICAL FIELD

The present disclosure relates to a cutting tool. The present application claims a priority based on International Patent Application No. PCT/JP2020/024453 filed on Jun. 22, 2020, the entire contents of which are hereby incorporated by reference.

BACKGROUND ART

Japanese Patent Laying-Open No. 2017-159380 (PTL 1) discloses an end mill having a rake face in which a plurality of streaks (recesses) are formed.

CITATION LIST

Patent Literature

PTL 1: Japanese Patent Laying-Open No. 2017-159380

SUMMARY OF INVENTION

A cutting tool according to the present disclosure includes a rake face, a flank face, and a cutting edge. The cutting edge is located between the rake face and the flank face. The cutting tool includes a substrate composed of a cubic boron nitride sintered material, and an oxide layer that covers the substrate and that constitutes part or whole of at least one of the rake face, the flank face, and the cutting edge. The oxide layer includes at least one element selected from a group consisting of titanium, aluminum, zirconium, and cobalt. A thickness of the oxide layer is 2 μm or less.

BRIEF DESCRIPTION OF DRAWINGS

FIG. 3 is a schematic cross sectional view when viewed along a line of FIG. 2.

FIG. 19 is a schematic cross sectional view showing a state in which cutting is performed using the cutting tool according to the fifth embodiment.

DETAILED DESCRIPTION

Figure 1:
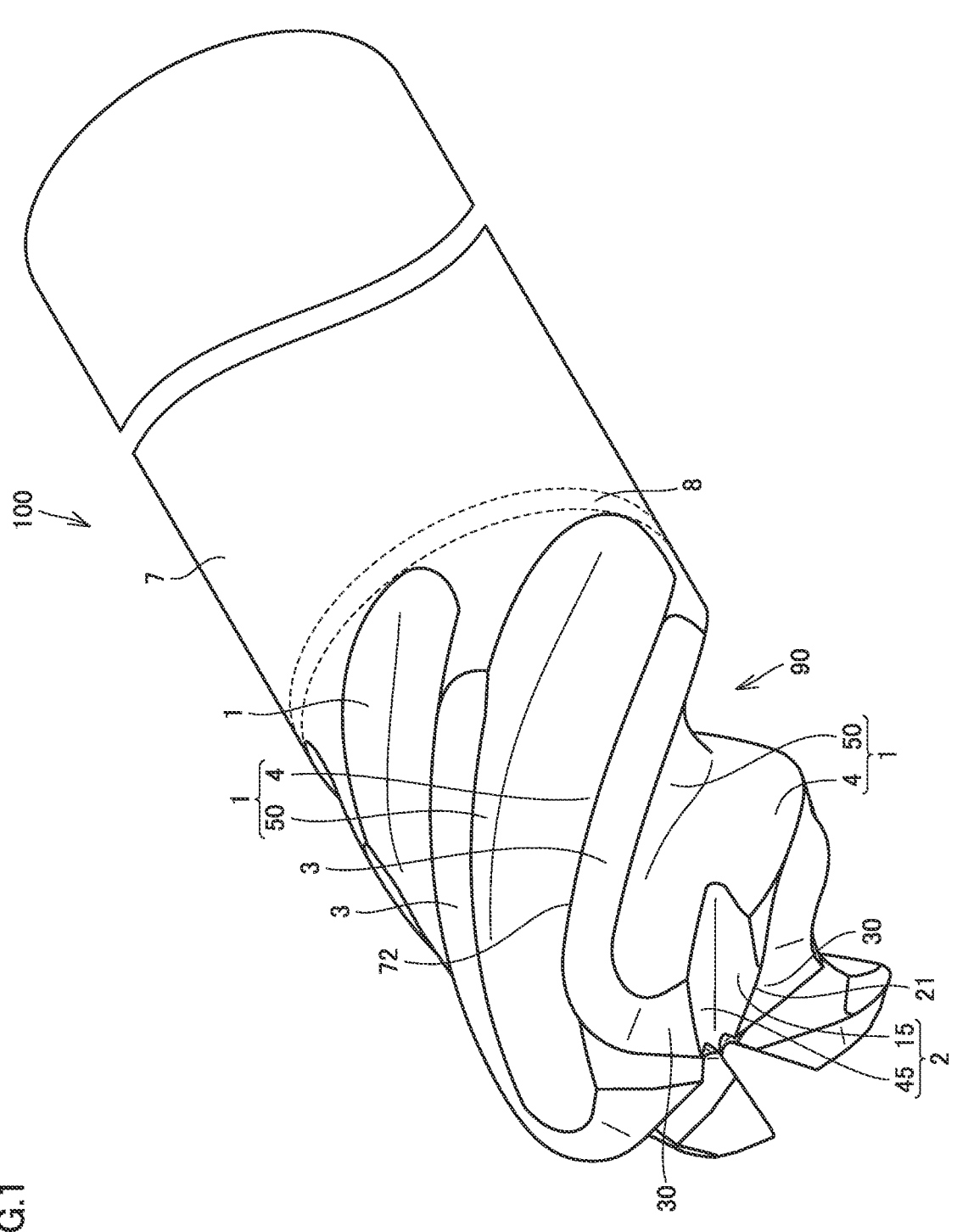
FIG. 1 is a schematic perspective view showing a configuration of a cutting tool according to a first embodiment.

Problem to be Solved by the Present Disclosure

When cutting a workpiece using a rotary cutting tool, centrifugal force acts on coolant, with the result that it is difficult to keep the coolant in the vicinity of a cutting point while effectively transporting the coolant to the vicinity of the cutting point. In the end mill described in Japanese Patent Laying-Open No. 2017-159380, the coolant is kept in a valley portion of the recess provided in the rake face, thereby improving lubricity. However, when large cutting resistance is exerted on the cutting edge in the end mill, stress is concentrated in the recess, with the result that its life until breakage of the cutting edge may be short.

Advantageous Effect of the Present Disclosure

According to the present disclosure, the life of a cutting tool breakage of a cutting edge can be extended.

Summary of Embodiments of the Present Disclosure

First, summary of embodiments of the present disclosure will be described.

(1) A cutting tool 100 according to the present disclosure includes a rake face 4, a flank face 3, and a cutting edge 72. Cutting edge 72 is located between rake face 4 and flank face 3. Cutting tool 100 includes a substrate Si composed of a cubic boron nitride sintered material, and an oxide layer 80 that covers substrate 81 and that constitutes part or whole of at least one of rake face 4, flank face 3, and cutting edge 72. Oxide layer 80 includes at least one element selected from a group consisting of titanium, aluminum, zirconium, and cobalt. A thickness of oxide layer 80 is 2 μm or less.

(2) in cutting tool 100 according to (1), the thickness of oxide layer 80 may be 30 nm or more and 300 nm or less.

(3) In cutting tool 100 according to (1) or (2), when a cutting region 22 is defined as a region sandwiched between a first imaginary line 4*b* and a second imaginary line 3*b*, a ratio of an area occupied by oxide layer 80 in cutting region 22 may be 20% or more and 80% or less, first imaginary line 4*b* being separated by 200 μm on rake face 4 from an imaginary ridgeline D formed by intersection of a plane obtained by extending rake face 4 and a plane obtained by extending flank face 3, second imaginary line 3*b* being separated by 200 μm on flank face 3 from imaginary ridgeline D.

(4) In cutting tool 100 according to any one of (1) to (3), substrate 81 may include cubic boron nitride grains 23 and a binder 25 in contact with cubic boron nitride grains 23. Oxide layer 80 may be contiguous to binder 25.

(5) In cutting tool 100 according to (4), part of cubic boron nitride grains 23 may be exposed from oxide layer 80.

DESCRIPTION OF EMBODIMENTS

Hereinafter, an embodiment of the present disclosure (hereinafter, also referred to as "the present embodiment") will be described in detail with reference to figures. It should be noted that in the below-described figures, the same or corresponding portions are denoted by the same reference characters and will not be described repeatedly.

First Embodiment

Figure 2:
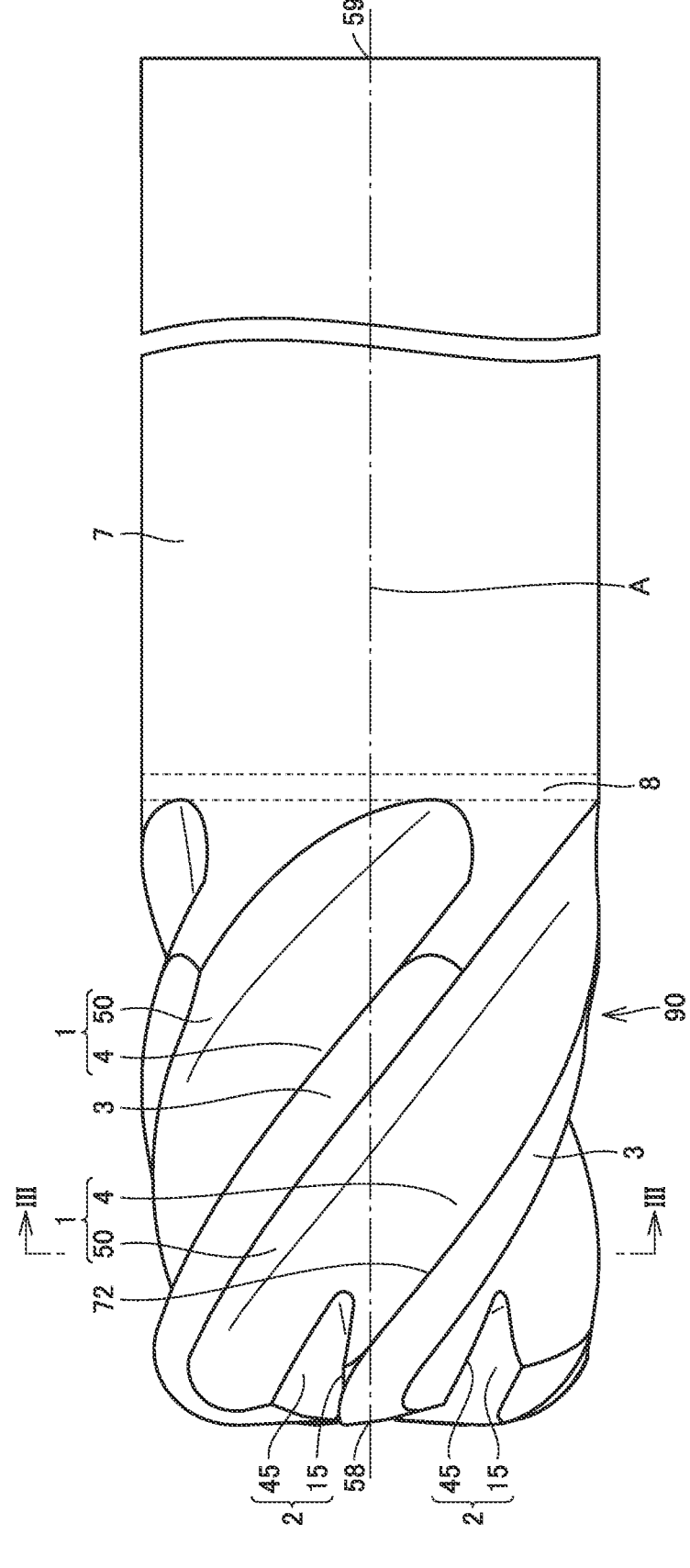
FIG. 2 is a schematic side view showing the configuration of the cutting tool according to the first embodiment.

FIG. 1 is a schematic perspective view showing a configuration of a cutting tool 100 according to a first embodiment. FIG. 2 is a schematic side view showing the configuration of cutting tool 100 according to the first embodiment. As shown in FIGS. 1 and 2, cutting tool 100 according to the present embodiment is, for example, an end mill, and is constituted of a cutting edge portion 90, a joining portion 8, and a shank portion 7. Cutting edge portion 90 has first rake faces 4, first flank faces 3, second rake faces 15, second flank faces 30, outer peripheral cutting edges 72, bottom cutting edges 21, and a front end 58. Shank portion 7 has a rear end 59. Cutting edge portion 90 is fixed to shank portion 7 by joining portion 8. Joining portion 8 is a brazing material. Joining portion 8 is located between cutting edge portion 90 and shank portion 7.

Cutting tool 100 is rotatable about an axis line A, From another viewpoint, it can be said that axis line A is a rotation axis of cutting tool 100. A material of cutting edge portion 90 includes, for example, a cubic boron nitride (cBN) sintered material. Shank portion 7 includes, for example, a cemented carbide. Examples of the cemented carbide include: a tungsten carbide (WC)-based cemented carbide; a cemented carbide including WC and Co; and a cemented carbide including WC as well as a carbonitride of Cr, Ti, Ta, Nb or the like added therein.

Front end 58 of cutting tool 100 is a portion to face a workpiece. Rear end 59 of cutting tool 100 is a portion to face a tool for rotating cutting tool 100. Shank portion 7 is a portion to be attached to the tool for rotating cutting tool 100. A direction along axis line A is an axial direction. A direction perpendicular to the axial direction is a radial direction. In the present specification, a direction from front end 58 toward rear end 59 is referred to as rearward in the axial direction. On the other hand, a direction from rear end 59 toward front end 58 is referred to as forward in the axial direction.

As shown in FIGS. 1 and 2, first flank face 3 is contiguous to first rake face 4. A ridgeline between first rake face 4 and first flank face 3 may constitute outer peripheral cutting edge 72. Second flank face 30 is contiguous to second rake face 15. A ridgeline between second rake face 15 and second flank face 30 constitutes bottom cutting edge 21. First rake face 4 is contiguous to second rake face 15. First rake face 4 is located rearward in the axial direction with respect to second rake face 15. First flank face 3 is contiguous to second flank face 30. First flank face 3 is located rearward in the axial direction with respect to second flank face 30.

First chip discharging flutes 1 and second chip discharging flutes 2 are formed in cutting edge portion 90 of cutting tool 100. Each of first chip discharging flutes 1 is constituted of first rake face 4 and a first chip discharging surface 50. Each of second chip discharging flutes 2 is constituted of second rake face 15 and a second chip discharging surface 45. Second chip discharging surface 45 is contiguous to first chip discharging surface 50. First chip discharging flute 1 is provided in the form of a helix around axis line A. Second chip discharging flute 2 is contiguous to first chip discharging flute 1, in the direction along axis line A, the length of first chip discharging flute 1 is longer than the length of second chip discharging flute 2.

Cutting tool 100 according to the present embodiment is, for example, a multi-edged rotary cutting tool 100. Specifically, the number of outer peripheral cutting edges 72 is, for example, 2 or more. The lower limit of the number of outer peripheral cutting edges 72 is not particularly limited, but may be, for example, 4 or more or 8 or more. The upper limit of the number of outer peripheral cutting edges 72 is not particularly limited, but may be, for example, 20 or less or 16 or less. In cutting tool 100 shown in FIG. 1, the number of outer peripheral cutting edges 72 is 5. The number of bottom cutting edges 21 may be the same as the number of outer peripheral cutting edges 72.

Figure 3:
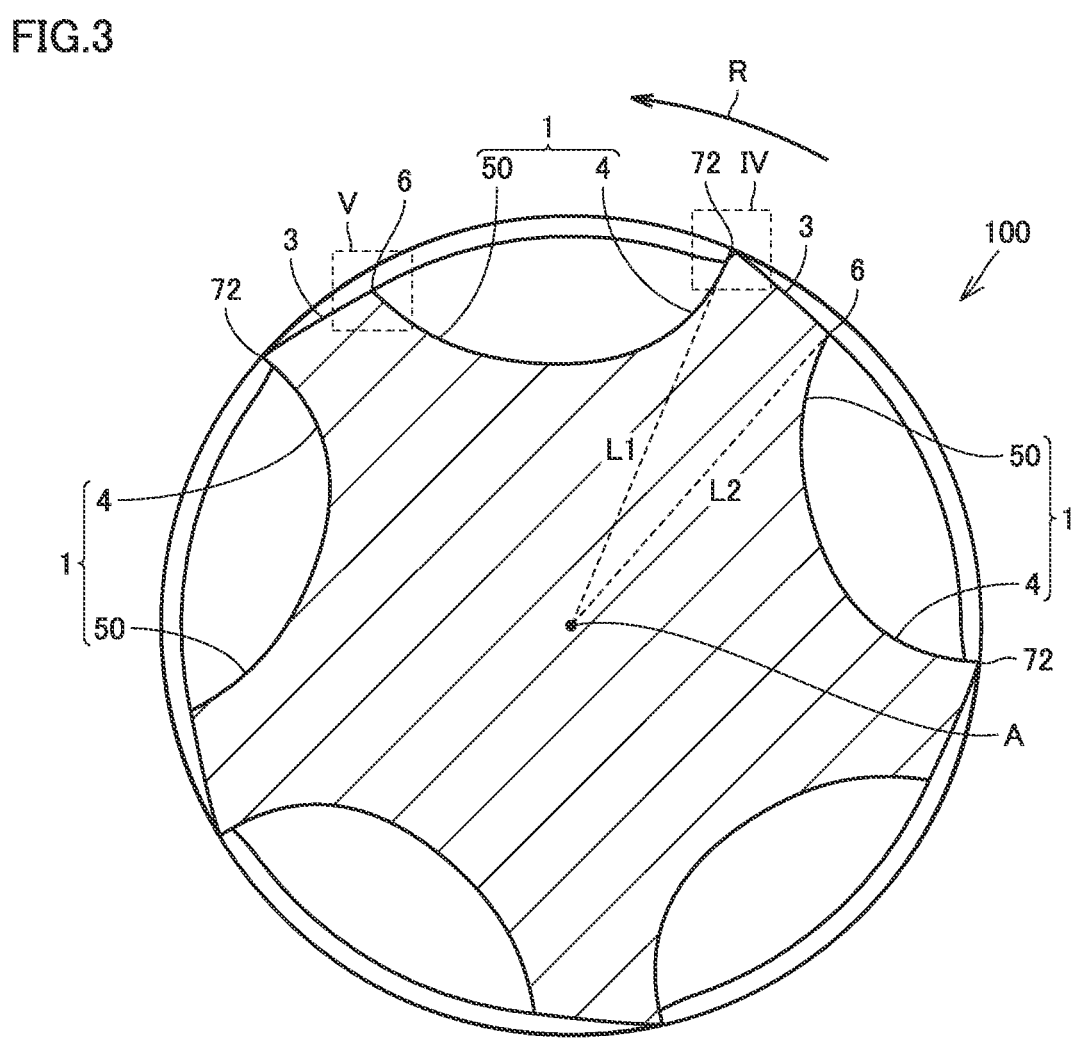

FIG. 3 is a schematic cross sectional view when viewed along a line III-III of FIG. 2. The cross section shown in FIG. 3 is a cross section perpendicular to the axis line. As shown in FIG. 3, the plurality of first chip discharging flutes 1 are disposed in a peripheral direction (rotation direction ft). Similarly, the plurality of first flank faces 3 are disposed in the peripheral direction. Similarly, the plurality of outer peripheral cutting edges 72 are disposed in the peripheral direction. That is, when assuming that a combination of first flank face 3, first chip discharging flute", and outer peripheral cutting edge 72 is one cutting component, a plurality of the cutting components are disposed in the peripheral direction. In each of the cutting components, first chip discharging flute 1 is located forward in the rotation direction with respect to first flank face 3. In the cutting component, first rake face 4 is located forward in the rotation direction with respect to outer peripheral cutting edge 72. In the cutting component, first chip discharging surface 50 is located forward in the rotation direction with respect to first rake face 4.

As shown in FIG. 3, first flank faces 3 and first chip discharging flutes 1 are located alternately in rotation direction R. One end of each first flank face 3 may constitute outer peripheral cutting edge 72, The other end of first flank face 3 constitutes a tail portion 6. First flank face 3 may be contiguous to first rake face 4 at outer peripheral cutting edge 72, First flank face 3 is contiguous to first chip discharging surface 50 at tail portion 6. In the radial direction, a length (first length L1) from axis line A to outer peripheral cutting edge 72 is longer than a length (second length L2) from axis line A to tail portion 6.

Figure 4:
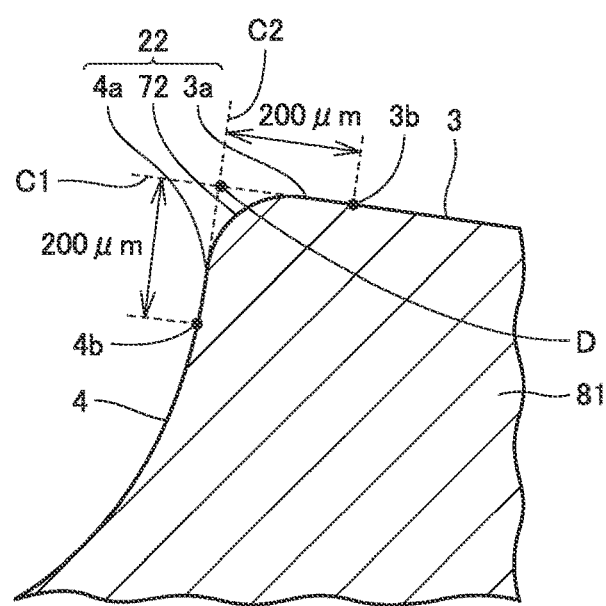
FIG. 4 is an enlarged schematic view of a region IV in FIG. 3.

FIG. 4 is an enlarged schematic view of a region IV in FIG. 3. As shown in FIG. 4, cutting tool 100 according to the first embodiment has cutting edge 72. Cutting edge 72 is located between rake face 4 and flank face 3. As shown in FIG. 4, in the cross section perpendicular to axis line A, cutting edge 72 may have an arc shape that protrudes toward the outer side. Cutting edge 72 may be subjected to a chamfering process (honing process). Cutting tool 100 has a substrate 81. Substrate 81 is composed of a cubic boron nitride sintered material.

Cutting tool 100 has a cutting region 22. Cutting region 22 is a region sandwiched between a first imaginary line 4b separated by 200 μm on rake face 4 from an imaginary ridgeline D and a second imaginary line 3b separated by 200 μm on flank face 3 from imaginary ridgeline D. Imaginary ridgeline D is a line formed by intersection of a plane (second extension plane C2) obtained by extending rake face 4 and a plane (first extension plane C1) obtained by extending flank face 3. Specifically, cutting region 22 includes a first cutting region portion 4a, a second cutting region portion 3a, and cutting edge 72. First cutting region portion 4a is located at rake face 4. First cutting region portion 4a is contiguous to cutting edge 72. Second cutting region portion 3a is located at flank face 3. Second cutting region portion 3a is contiguous to cutting edge 72. Cutting edge 72 is a region sandwiched between first cutting region portion 4a and second cutting region portion 3a.

Figure 5:
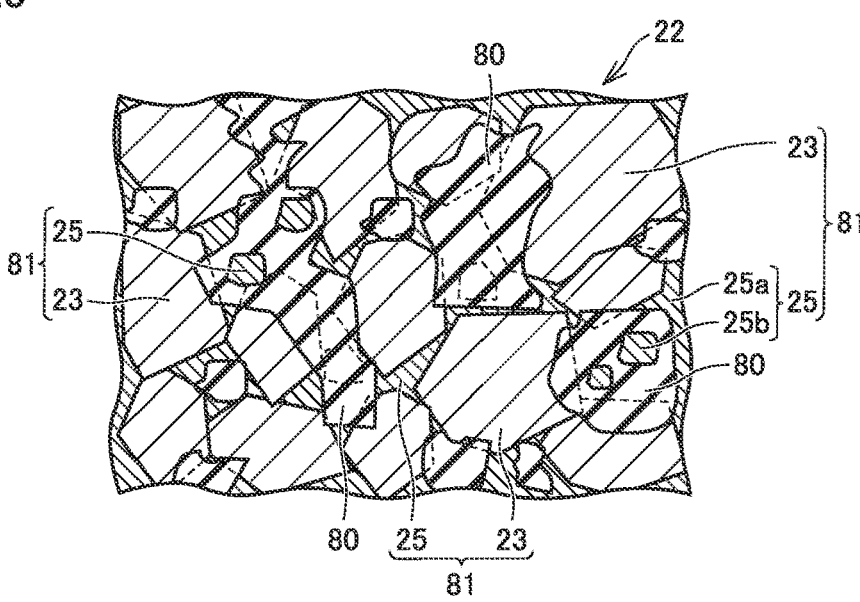
FIG. 5 is a schematic plan view showing a configuration of a cutting region.

FIG. 5 is a schematic plan view showing a configuration of cutting region 22. The schematic plan view shown in FIG. 5 is a diagram when viewed in a direction perpendicular to cutting region 22. As shown in FIG. 5, substrate 81 includes cubic boron nitride grains 23 and a binder 25. Binder 25 is in contact with cubic boron nitride grains 23. Binder 25 may be sandwiched between two adjacent cubic boron nitride grains 23. Binder 25 may be provided to surround cubic boron nitride grains 23. Binder 25 includes at least one of aluminum (Al), titanium (Ti), chromium (Cr), zirconium (Zr), cobalt (Co), and tungsten (W).

As shown in FIG. 5, cutting tool 100 has an oxide layer 80. Oxide layer 80 is in contact with substrate 81. Oxide layers 80 may be provided to be separated from each other. Binder 25 may have a first binder portion 25a and a second binder portion 25b. Second binder portion 25b may be surrounded by oxide layer 80 when viewed in a direction perpendicular to cutting region 22. Second binder portion 25b is in contact with oxide layer 80. When viewed in the direction perpendicular to cutting region 22, first binder portion 25a may be separated from second binder portion 25b by oxide 1.0 layer 80. First binder portion 25a may be in contact with each of oxide layer 80 and cubic boron nitride grain 23. Second binder portion 25b may be separated from cubic boron nitride grain 23.

An ratio of an area occupied by oxide layer 80 in cutting region 22 is, for example, 20% or more and 80% or less. This is a value obtained by dividing the total area of oxide layer 80 in cutting region 22 by the area of cutting region 22. The lower limit of the ratio of the area occupied by oxide layer 80 in cutting region 22 is not particularly limited, but may be 25% or more, 30% or more, or 35% or more, for example. The upper limit of the ratio of the area occupied by oxide layer 80 in cutting region 22 is not particularly limited, but may be 75% or less, 70% or less, or 65% or less, for example.

The ratio of the area occupied by oxide layer 80 in cutting region 22 is not particularly limited, but may be 20% or more and 75% or less, 20% or more and 70% or less, 20% or more and 65% or less, 25% or more and 80% or less, 30% or more and 80% or less, 35% or more and 80% or less, 25% or more and 75% or less, 25% or more and 70% or less, or 30% or more and 75% or less, for example.

Next, a method of measuring the ratio of the area occupied by oxide layer 80 in cutting region 22 will be described.

First, after a region including cutting region 22 is cut by a FIB (Focused Ion Beam) apparatus or WEDM, a cross section polisher apparatus or the like is used to produce a sample for observing a cross section in a direction perpendicular to the cutting edge ridgeline. Next, a scanning electron microscope (SEM) is used to observe a plurality of visual fields (about four visual fields) such that the length of the surface is 150 μm or more within a range of 200 μm from the cutting edge ridgeline (400 μm when summing up the region in the rake face direction and the region in the flank face direction). The magnification of the SEM is set to 50000×, In the observed cross section, a ratio of lumps of the oxide layer each having a thickness of 10 nm or more in the surface layer is defined as the area ratio of the oxide layer. Whether or not the observed region is the oxide layer is determined using EDS. An acceleration voltage is set to 5 kV. A region in which 10 at % or more of oxygen is detected through K or L rays is determined as the oxide layer.

Oxide layer 80 includes at least one element selected from a group consisting of titanium (Ti), aluminum (Al), zirconium (Zr), and cobalt (Co). Oxide layer 80 is TiO, $Al_2O_3$, TiBNO, ZrO, AlBNO, CoO, CoWBO, or the like, for example. Oxide layer 80 may include two or more types of oxides. Specifically, oxide layer 80 may include at least two types of oxide films among TiO, $Al_2O_3$, TiBNO, ZrO, AlBNO, CoO, and CoWBO, for example. A type of oxide compound can be identified using a micro X-ray diffraction (XRD) apparatus or a transmission electron microscope (TEM).

Oxide layer 80 constitutes part or whole of at least one of rake face 4, flank face 3, and cutting edge 72. Oxide layer 80 may constitute part or whole of rake face 4. Oxide layer 80 may constitute part or whole of flank face 3. Oxide layer 80 may constitute part or whole of cutting edge 72. Oxide layer 80 may constitute part or whole of cutting region 22.

Figure 6:
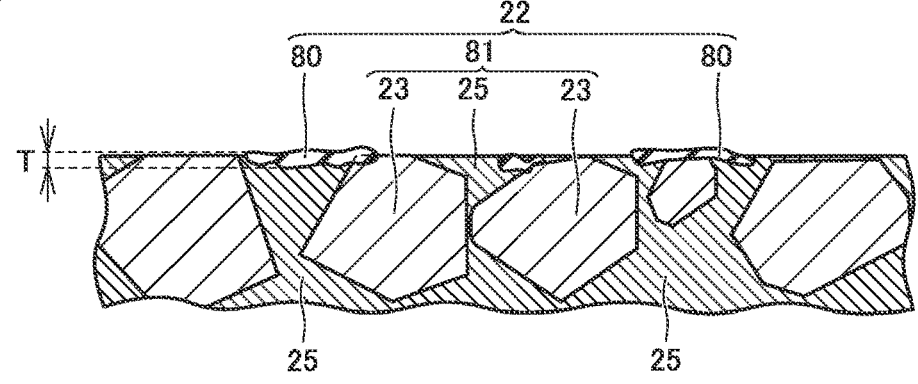
FIG. 6 is a schematic cross sectional view showing the configuration of the cutting region.

FIG. 6 is a schematic cross sectional view showing the configuration of cutting region 22, The schematic cross sectional view shown in FIG. 6 is perpendicular to axis line A. As shown in FIG. 6, part of oxide layer 80 is exposed in cutting region 22. From another viewpoint, it can be said that oxide layer 80 constitutes part of cutting region 22. Oxide layer 80 may be contiguous to binder 25. Oxide layer 80 may be formed by oxidizing part of the elements of binder 25. From another viewpoint, it can be said that oxide layer 80 may include an element included in binder 25. Oxide layer 80 covers substrate 81, Oxide layer 80 may cover whole or part of cubic boron nitride grains 23. Oxide layer 80 may cover whole or part of binder 25. Oxide layer 80 may be in contact with cubic boron nitride grains 23 so as to cover part of cubic boron nitride grains 23. Part of cubic boron nitride grains 23 may be exposed from oxide layer 80.

As shown in FIG. 6, part of cubic boron nitride grains 23 may be exposed in cutting region 22. From another viewpoint, it can be said that cubic boron nitride grains 23 may constitute part of cutting region 22. Binder 25 may be located on a deeper side with respect to oxide layer 80. Part of binder 25 may be exposed in cutting region 22. From another viewpoint, it can be said that binder 25 may constitute part of cutting region 22.

As shown in FIG. 6, thickness T of oxide layer 80 is, for example, 30 nm or more and 300 nm or less. Thickness T of oxide layer 80 is a thickness in a direction perpendicular to a tangent to cutting region 22. The lower limit of thickness T of oxide layer 80 is not particularly limited, but may be 45 nm or more, 60 nm or more, or 75 nm or more, for example. The upper limit of thickness T of oxide layer 80 is not particularly limited, but may be, for example, 275 nm or less, 250 nm or less, or 225 nm or less.

Thickness T of oxide layer 80 is not particularly limited but may be, for example, 30 nm or more and 2.75 nm or less, 30 nm or more and 2.50 nm or less, 30 nm or more and 225 nm or less, 45 nm or more and 300 nm or less, 60 nm or more and 300 nm or less, 75 nm or more and 300 nm or less, 45 nm or more and 275 nm or less, 60 nm or more and 250 nm or less.

Next, a method of measuring the thickness of oxide layer 80 will be described. As shown in FIG. 6, thickness T of oxide layer 80 can be measured by observing the cross section of cutting region 22 using a SEM, Specifically, after the region including cutting region 22 is cut by the FIB apparatus or WEDM, the cross section polisher apparatus or the like is used to produce the sample for observing the cross section in the direction perpendicular to the cutting edge ridgeline. Next, the SEM is used to observe the plurality of visual fields (about four visual fields) such that the length of the surface is 150 μm or more within a range of 200 μm from the cutting edge ridgeline (400 μm when summing up the region in the rake face direction and the region in the flank face direction). The magnification of the SEM is set to 50000×. In the observed cross section, the lumps of the oxide layer each having a thickness of 10 nm or more are identified. The identified lumps are analyzed using image analysis software (WINROOF). Specifically, the thicknesses of the lumps are measured at intervals of 100 nm, and the average value thereof is regarded as the thickness of oxide layer 80.

Next, a method of forming oxide layer 80 is described. Oxide layer 80 may be formed by irradiating the surface of substrate 81 with laser so as to oxidize part of the elements of binder 25. Specifically, the surface of substrate 81 in which cutting region 22 is formed is irradiated with laser. The laser is, for example, YAG laser. The wavelength of the laser is set to, for example, 1064 nm. The output of the laser is set to, for example, 5 W. The surface including cutting region 22 is irradiated with the laser using a Galvanometer scanner.

(First Modification)

Figure 7:
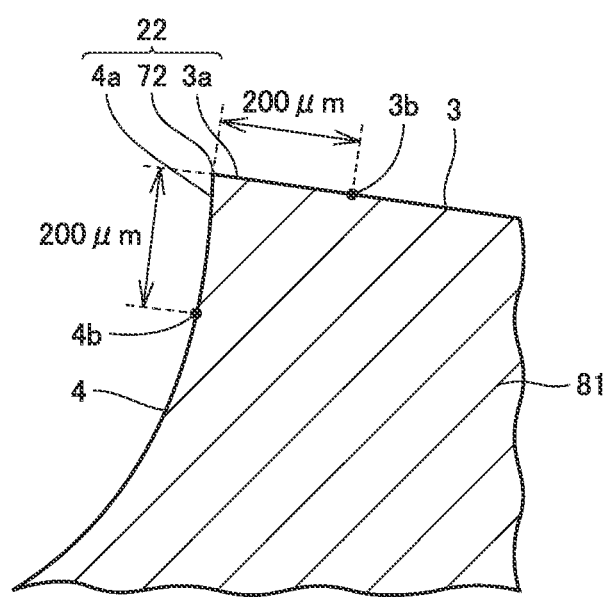
FIG. 7 is an enlarged schematic cross sectional view showing a configuration of a first modification of the cutting tool according to the first embodiment.

Next, a configuration of a first modification of cutting tool 100 according to the first embodiment will be described. FIG. 7 is an enlarged schematic cross sectional view showing the configuration of the first modification of cutting tool 100 according to the first embodiment. The schematic diagram shown in FIG. 7 corresponds to region IV in FIG. 3. As shown in FIG. 7, cutting edge 72 of cutting tool 100 may be acute. In this case, imaginary ridgeline D coincides with cutting edge 72. First cutting region portion 4a is a region sandwiched between cutting edge 72 and first imaginary line 4b separated by 200 μm on rake face 4 from cutting edge 72. Second cutting region portion 3a is a region sandwiched between cutting edge 72 and second imaginary line 3b separated by 200 nm on flank face 3 from cutting edge 72.

(Second Modification)

Figure 8:
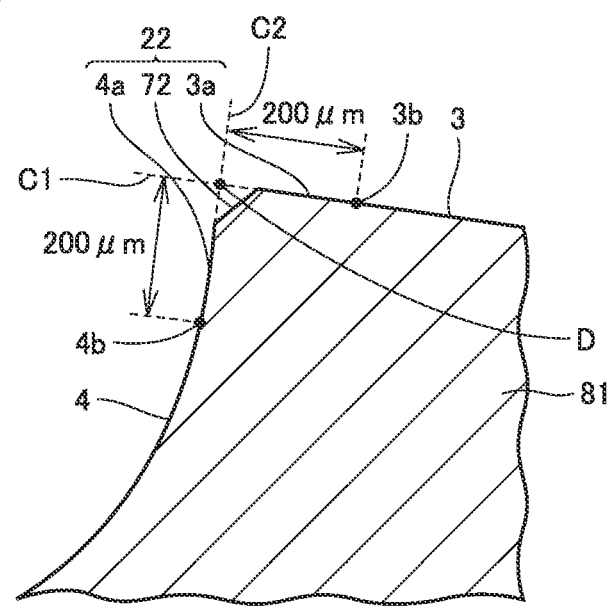
FIG. 8 is an enlarged schematic cross sectional view showing a configuration of a second modification of the cutting tool according to the first embodiment.

Next, a configuration of a second modification of cutting tool 100 according to the first embodiment will be described. FIG. 8 is an enlarged schematic cross sectional view showing the configuration of the second modification of cutting tool 100 according to the first embodiment. The schematic diagram shown in FIG. 8 corresponds to region IV in FIG. 3. As shown in FIG. 8, cutting edge 72 of cutting tool 100 may be a negative land having a flat shape. Cutting edge 72 may be inclined with respect to each of rake face 4 and flank face 3. First cutting region portion 4a is a region sandwiched between a boundary line between cutting edge 72 and rake face 4 and first imaginary line 4b separated by 200 μm on rake face 4 from imaginary ridgeline D. Second cutting region portion 3a is a region sandwiched between a boundary line between cutting edge 72 and flank face 3 and second imaginary line 3b separated by 200 μm on flank face 3 from imaginary ridgeline D.

Second Embodiment

Next, a configuration of a cutting tool 100 according to a second embodiment will be described. Cutting tool 100 according to the second embodiment is different from cutting tool 100 according to the first embodiment mainly in terms of such a configuration that oxide layer 80 covers the whole surface of substrate 81, and is the same as cutting tool 100 according to the first embodiment in terms of the other configurations. Hereinafter, the configuration different from that of cutting tool 100 according to the first embodiment will be mainly described.

Figure 9:
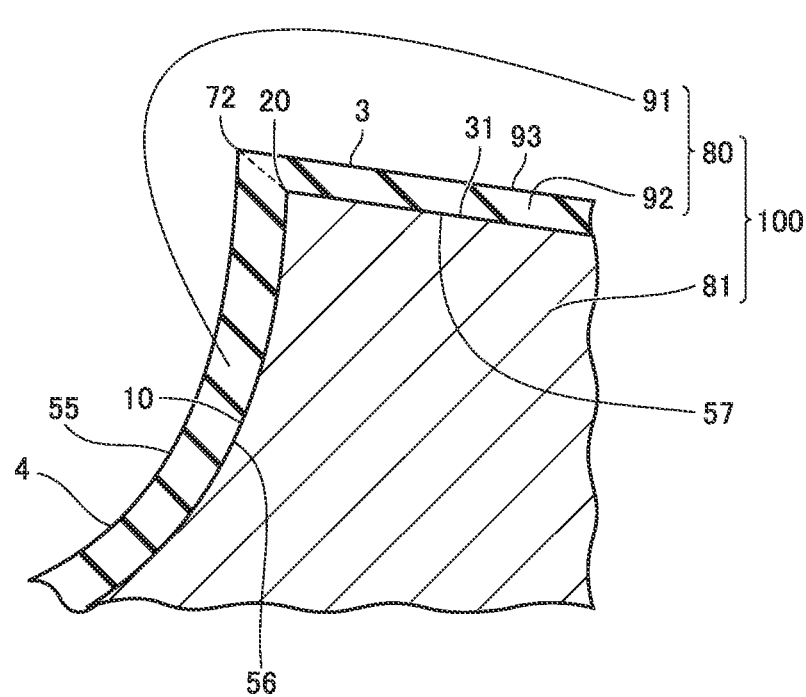
FIG. 9 is a first schematic cross sectional view showing a configuration of a cutting tool according to a second embodiment.

FIG. 9 is a first schematic cross sectional view showing the configuration of cutting tool 100 according to the second embodiment. The schematic diagram shown in FIG. 9 corresponds to region IV in FIG. 3. As shown in FIG. 9, in the cross section perpendicular to axis line A, cutting edge portion 90 of cutting tool 100 according to the second embodiment has substrate 81 and oxide layer 80. Oxide layer 80 has, for example, a first oxide film 91 and a second oxide film 92. Substrate 81 has a first surface 10. First surface 10 faces rake face 4. First oxide film 91 has a second surface 56 and a third surface 55. Second surface 56 is in contact with first surface 10. Third surface 55 is located opposite to second surface 56. Third surface 55 constitutes at least part of rake face 4. In other words, the whole surface of third surface 55 may be rake face 4, or part of third surface 55 may be rake face 4.

Substrate 81 has a fifth surface 31. Fifth surface 31 is contiguous to first surface 10. Fifth surface 31 faces flank face 3. A boundary between first surface 10 and fifth surface 31 is a first ridgeline 20. Second oxide film 92 constitutes at least part of flank face 3. Second oxide film 92 has a sixth surface 57 in contact with fifth surface 31, and a seventh surface 93 located opposite to sixth surface 57. Seventh surface 93 constitutes at least part of flank face 3. In other words, the whole surface of seventh surface 93 may be flank face 3, or part of seventh surface 93 may be flank face 3.

As shown in FIG. 9, first oxide film 91 may be contiguous to second oxide film 92. First oxide film 91 may be formed in one piece with second oxide film 92. The thickness of second oxide film 92 may be smaller than the thickness of first oxide film 91.

The thickness of first oxide film 91 (hereinafter, also referred to as "first thickness") is, for example, 2 μm or less. The first thickness is a thickness of first oxide film 91 in a direction perpendicular to a tangent to first rake face 4. The first thickness may be, for example, 1 μm or less, or 0.1 μm or less. The lower limit of the first thickness is not particularly limited, but may be, for example, 0.01 μm or more.

The thickness of second oxide film 92 (hereinafter, also referred to as "second thickness") is, for example, 2 μm or less. The second thickness is a thickness of second oxide film 92 in the direction perpendicular to the tangent to first flank face 3. The second thickness may be, for example, 1 μm or less, or 0.1 μm or less. The lower limit of the second thickness is not particularly limited, but may be, for example, 0.01 μm or more.

(Method of Observing Oxide Film)

Next, a method of observing first oxide film 91 and second oxide film 92 will be described. First, cutting is performed in a cross section perpendicular to the axis line, thereby obtaining a measurement sample. The measurement sample is buried in a resin, and a CP (Cross Section Polish) process is performed onto the cross section.

The composition of each of first oxide film 91 and second oxide film 92 can be specified using, for example, an energy dispersive X-ray spectroscopy (EDX) apparatus accompanied with a scanning electron microscope (SEM). As the SEM, for example, "JSM-7800F" provided by JEOL can be used. As the for example, an OctaneElect EDS system can be used. A measurement magnification can be set to, for example, 5000×.

When a creepage distance from outer peripheral cutting edge 72 to tail portion 6 in first chip discharging flute 1 is defined as 1, the thickness of first oxide film 91 is an average value of the thickness of first oxide film 91 at a position separated by a length of 0.1×D1 from outer peripheral cutting edge 72 in a direction toward tail portion 6, the thickness of first oxide film 91 at a position separated by a length of 0.5×D1 from outer peripheral cutting edge 72 in the direction toward tail portion 6, and the thickness of first oxide film 91 at a position separated by a length of 0.9×D1 from outer peripheral cutting edge 72 in the direction toward tail portion 6. When a creepage distance from outer peripheral cutting edge 72 to tail portion 6 in first flank face 3 is defined as D2, the thickness of second oxide film 92 is a thickness of second oxide film 92 at a position separated by a length of 0.5×D2 from outer peripheral cutting edge 72 in the direction toward tail portion 6 (in other words, the center position of first flank face 3).

Figure 10:
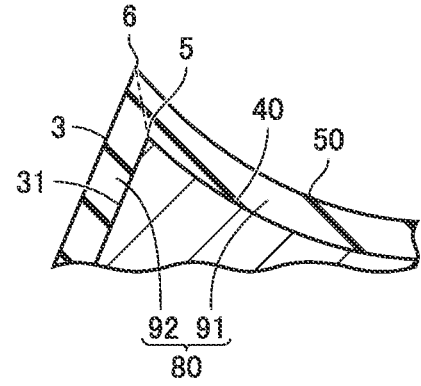
FIG. 10 is a second schematic cross sectional view showing the configuration of the cutting tool according to the second embodiment.

FIG. 10 is a second schematic cross sectional view showing the configuration of cutting tool 100 according to the second embodiment. The schematic diagram shown in FIG. 10 corresponds to a region V in FIG. 3. As shown in FIG. 10, substrate 81 has an eighth surface 40. Eighth surface 40 faces first chip discharging surface 50. Eighth surface 40 is contiguous to each of first surface 10 and fifth surface 31. In the peripheral direction, eighth surface 40 is located between first surface 10 and fifth surface 31. A boundary between eighth surface 40 and fifth surface 31 constitutes a second ridgeline 5. First oxide film 91 may be in contact with eighth surface 40. First oxide film 91 may be in contact with second ridgeline 5. Second oxide film 92 may be in contact with second ridgeline 5. First oxide film 91 may be provided continuously from first ridgeline 20 to second ridgeline 5 in first chip discharging flute 1. Second oxide film 92 may be provided continuously from first ridgeline 20 to second ridgeline 5 in first flank face 3.

First oxide film 91 may include at least one of aluminum, titanium, chromium, zirconium, cobalt, and tungsten. First oxide film 91 may be, for example, a coating film. The coating film may be formed by, for example, a CVD (Chemical Vapor Deposition) method or a PVD (Physical Vapor Deposition) method.

First oxide film 91 may be formed by irradiating the surface of substrate 81 with laser so as to oxidize part of the elements of substrate 81. First oxide film 91 may be an oxide of part of the elements of substrate 81. Specifically, first oxide film 91 may be an oxide of an element of binder 25 included in substrate 81. First oxide film 91 may include, for example, $Al_2O_3$, $TiO_2$, CoO, $W_2O_3$, or the like.

Second oxide film 92 may include at least one of aluminum, titanium, chromium, zirconium, cobalt, and tungsten.

Second oxide film 92 may be, for example, a coating film. The coating film may be formed by, for example, a CVD method or a PVD method.

Second oxide film 92 may be formed by irradiating the surface of substrate 81 with laser so as to oxidize part of the elements of substrate 81. Second oxide film 92 may be an oxide of part of the elements of substrate 81. Specifically, second oxide film 92 may be an oxide of an element of binder 25 included in substrate 81. Second oxide film 92 may include, for example, $Al_2O_3$, $TiO_2$, CoO, $W_2O_3$, or the like.

Third Embodiment

Next, a configuration of a cutting tool 100 according to a third embodiment will be described. Cutting tool 100 according to the third embodiment is different from cutting tool 100 according to the second embodiment in terms of such a configuration that no second oxide film 92 is included, and is the same as cutting tool 100 according to second embodiment in terms of the other configurations. Hereinafter, the configuration different from that of cutting tool 100 according to the second embodiment will be mainly described.

Figure 11:
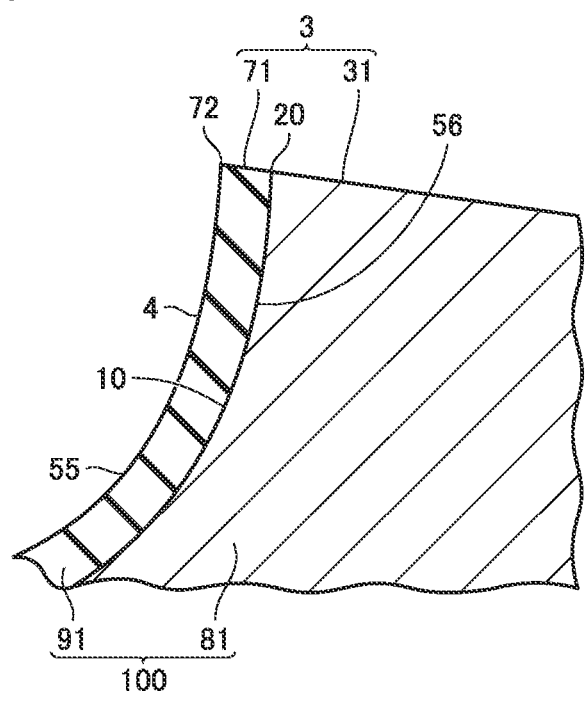
FIG. 11 is a partial schematic cross sectional view showing a configuration of a cutting tool according to a third embodiment.

FIG. 11 is a partial schematic cross sectional view showing the configuration of cutting tool 100 according to the third embodiment. The region shown in FIG. 11 corresponds to region IV in FIG. 3. As shown in FIG. 11, first oxide film 91 may include a fourth surface 71 that connects second surface 56 to third surface 55. Fourth surface 71 of first oxide film 91 is provided along fifth surface 31 of substrate 81. A ridgeline between third surface 55 and fourth surface 71 constitutes outer peripheral cutting edge 72. No oxide film is formed on fifth surface 31. From another viewpoint, it can be said that fifth surface 31 of substrate 81 is exposed from first oxide film 91. Fourth surface 71 constitutes at least part of first flank face 3. First flank face 3 may include fourth surface 71 and fifth surface 31.

Fourth Embodiment

Next, a configuration of a cutting tool 100 according to a fourth embodiment will be described. Cutting tool 100 according to the fourth embodiment is different from cutting tool 100 according to the second embodiment in terms of such a configuration that first oxide film 91 is separated from second oxide film 92, and is the same as cutting tool 100 according to the second embodiment in terms of the other configurations. Hereinafter, the configuration different from that of cutting tool 100 according to the second embodiment will be mainly described.

Figure 12:
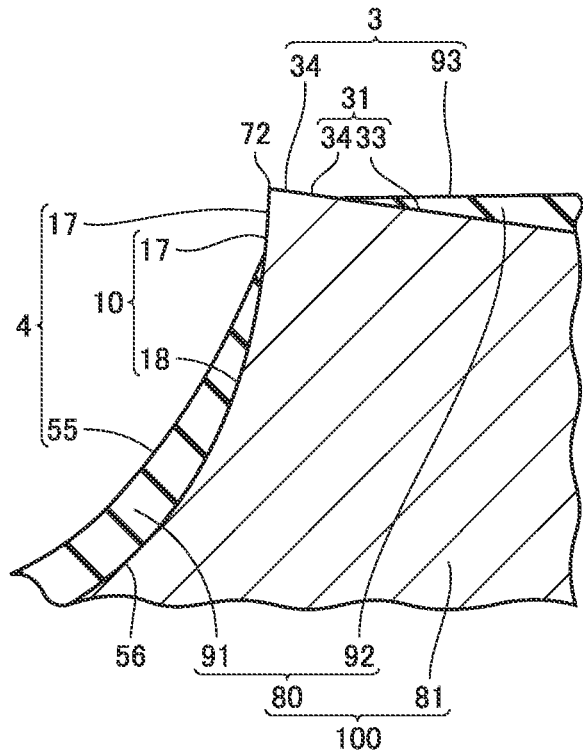
FIG. 12 is a partial schematic cross sectional view showing a configuration of a cutting tool according to a fourth embodiment.

FIG. 12 is a partial schematic cross sectional view showing the configuration of cutting tool 100 according to the fourth embodiment. The region shown in FIG. 12 corresponds to region IV in FIG. 3. As shown in FIG. 12, first oxide film 91 may be separated from second oxide film 92. Part of first surface 10 is exposed from first oxide film 91. First surface 10 has a first region 18 in contact with first oxide film 91, and a second region 17 contiguous to first region 18 and separated from first oxide film 91. Third surface 55 and second region 17 constitute rake face 4.

Part of fifth surface 31 is exposed from second oxide film 92. Fifth surface 31 has a third region 33 in contact with second oxide film 92, and a fourth region 34 contiguous to third region 33 and separated from second oxide film 92. Seventh surface 93 and fourth region 34 constitute flank face 3. A ridgeline between second region 17 and fourth region 34 constitute outer peripheral cutting edge 72. Second oxide film 92 may have a portion having a thickness that is increased in a direction further away from outer peripheral cutting edge 72.

Fifth Embodiment

Next, a configuration of a cutting tool 100 according to a fifth embodiment will be described. Cutting tool 100 according to the fifth embodiment is different from cutting tool 100 according to the second embodiment in terms of such a configuration that first surface 10 of substrate 81 is constituted of a plurality of straight line portions, and is the same as cutting tool 100 according to the second embodiment in terms of the other configurations. Hereinafter, the configuration different from that of cutting tool 100 according to the second embodiment will be mainly described.

Figure 13:
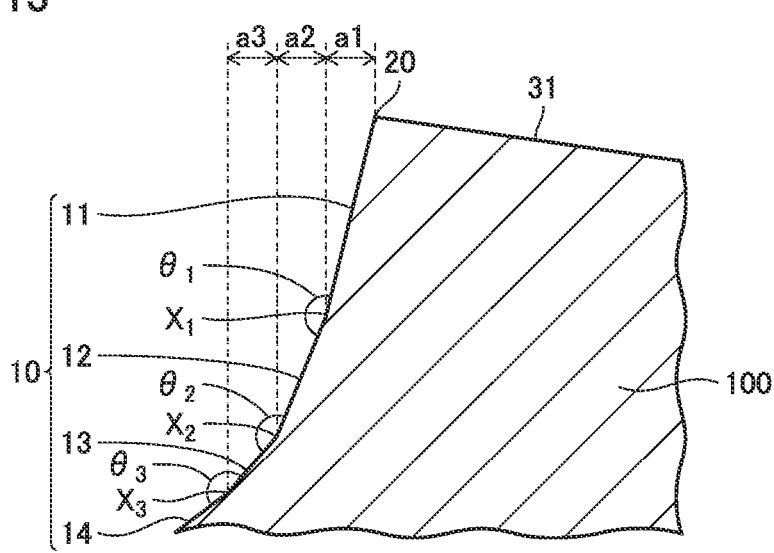
FIG. 13 is a first schematic cross sectional view showing a configuration of a cutting tool according to a fifth embodiment.

FIG. 13 is a first schematic cross sectional view showing the configuration of cutting tool 100 according to the fifth embodiment. The region shown in 13 corresponds to region IV in FIG. 3. In FIG. 13, only substrate 81 is shown and no oxide film is shown.

As shown in FIG. 13, in a cross section perpendicular to axis line A, first surface 10 is constituted of a plurality of straight line portions. The plurality of straight line portions have, for example, a first straight line portion 11, a second straight line portion 12, a third straight line portion 13, and a fourth straight line portion 14. First straight line portion 11 is contiguous to first flank face 3. First straight line portion 11 is inclined with respect to fifth surface 31. A boundary between first straight line portion 11 and fifth surface 31 is a first ridgeline 20. Second straight line portion 12 is inclined with respect to first straight line portion 11. Second straight line portion 12 is contiguous to first straight line portion 11. Second straight line portion 12 is located opposite to fifth surface 31 with respect to first straight line portion 11. From another viewpoint, it can be said that first straight line portion 11 is located between second straight line portion 12 and fifth surface 31.

Third straight line portion 13 is inclined with respect to second straight line portion 12. Third straight line portion 13 is contiguous to second straight line portion 12. Third straight line portion 13 is located opposite to first straight line portion 11 with respect to second straight line portion 12. From another viewpoint, it can be said that second straight line portion 12 is located between third straight line portion 13 and first straight line portion 11. Fourth straight line portion 14 is inclined with respect to third straight line portion 13. Fourth straight line portion 14 is contiguous to third straight line portion 13. Fourth straight line portion 14 is located opposite to second straight line portion 12 with respect to third straight line portion 13. From another viewpoint, it can be said that third straight line portion 13 is located between fourth straight line portion 14 and second straight line portion 12.

An angle formed by two adjacent straight line portions of the plurality of straight line portions may be decreased in a direction further away from fifth surface 31, Specifically, a first angle $\theta_1$ formed by first straight line portion 11 and second straight line portion 12 may be larger than a second angle $\theta_2$ formed by second straight line portion 12 and third straight line portion 13. Second angle $\theta_3$ formed by second straight line portion 12 and third straight line portion 13 may be larger than a third angle $\theta_3$ formed by third straight line portion 13 and fourth straight line portion 14. First angle $\theta_1$ is, for example, 140° or more and less than 180°. The lower limit of first angle $\theta_1$ is not particularly limited, but may be, for example, 150° or more, or 160° or more. The upper limit of first angle $\theta_1$ is not particularly limited, but may be, for example, 178° or less or 175° or less.

A boundary between first straight line portion 11 and second straight line portion 12 is a first position $X_1$. A boundary between second straight line portion 12 and third straight line portion 13 is a second position $X_2$. A boundary between third straight line portion 13 and fourth straight line portion 14 is a third position $X_3$. The length of first straight line portion 11 (direct distance between outer peripheral cutting edge 72 and first position $X_1$) may be larger than the length of second straight line portion 12 (direct distance between first position $X_1$ and second position $X_2$). The length of second straight line portion 12 (direct distance between first position $X_1$ and second position $X_2$) may be larger than the length of third straight line portion 13 (direct distance between second position $X_2$ and third position $X_3$).

In the rotation direction, a distance (first distance a1) between outer peripheral cutting edge 72 and first position $X_1$ may be the same as a distance (second distance a2) between first position $X_1$ and second position $X_2$. In the radial direction, the distance (second distance a2) between first position $X_1$ and second position $X_2$ may be the same as a distance (third distance a3) between second position $X_2$ and third position $X_3$.

Figure 14:
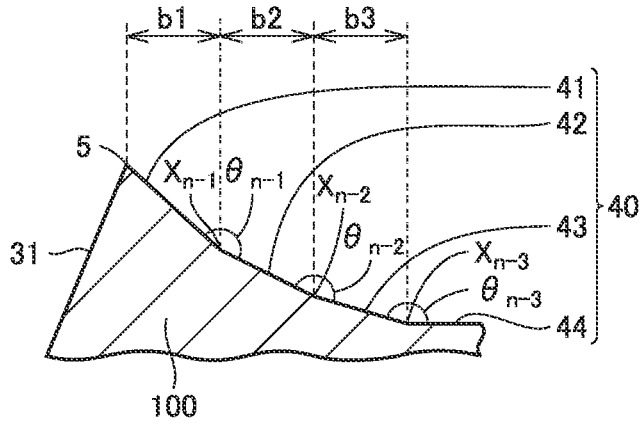
FIG. 14 is a second schematic cross sectional view showing the configuration of the cutting tool according to the fifth embodiment.

FIG. 14 is a second schematic cross sectional view showing the configuration of cutting tool 100 according to the fifth embodiment. The region shown in FIG. 14 corresponds to region V in FIG. 3. In FIG. 14, only substrate 81 is shown and no oxide film is shown.

As shown in FIG. 14, in a cross section perpendicular to axis line A, eighth surface 40 may be constituted of for example, a plurality of straight line portions. Eighth surface 40 has, for example, a fifth straight line portion 41, a sixth straight line portion 42, a seventh straight line portion 43, and an eighth straight line portion 44. Fifth straight line portion 41 is inclined with respect to fifth surface 31. Fifth straight line portion 41 is contiguous to second ridgeline 5. Sixth straight line portion 42 is inclined with respect to fifth straight line portion 41. Sixth straight line portion 42 is contiguous to fifth straight line portion 41. Sixth straight line portion 42 is located opposite to second ridgeline 5 with respect to fifth straight line portion 41. From another viewpoint, it can be said that fifth straight line portion 41 is located between sixth straight line portion 42 and second ridgeline 5.

Seventh straight line portion 43 is inclined with respect to sixth straight line portion 42. Seventh straight line portion 43 is contiguous to sixth straight line portion 42. Seventh straight line portion 43 is located opposite to fifth straight line portion 41 with respect to sixth straight line portion 42. From another viewpoint, it can be said that sixth straight line portion 42 is located between seventh straight line portion 43 and fifth straight line portion 41. Eighth straight line portion 44 is inclined with respect to seventh straight line portion 43. Eighth straight line portion 44 is contiguous to seventh straight line portion 43, Eighth straight line portion 44 is located opposite to sixth straight line portion 42 with respect to seventh straight line portion 43. From another viewpoint, it can be said that seventh straight line portion 43 is located between eighth straight line portion 44 and sixth straight line portion 42.

A fourth angle $\theta_{n-1}$ formed by fifth straight line portion 41 and sixth straight line portion 42 may be larger than a fifth angle $\theta_{n-2}$ formed by sixth straight line portion 42 and seventh straight line portion 43. Fifth angle $\theta_{n-2}$ formed by sixth straight line portion 42 and seventh straight line portion 43 may be larger than a sixth angle $\theta_{n-3}$ formed by seventh straight line portion 43 and eighth straight line portion 44.

A boundary between fifth straight line portion 41 and sixth straight line portion 42 is a fourth position $X_{n-1}$. A boundary between sixth straight line portion 42 and seventh straight line portion 43 is a fifth position $X_{n-2}$. A boundary between seventh straight line portion 43 and eighth straight line portion 44 is a sixth position $X_{n-3}$. The length of fifth straight line portion 41 (direct distance between second ridgeline 5 and fourth position $X_{n-1}$) may be larger than the length of sixth straight line portion 42 (direct distance between fourth position $X_{n-1}$ and fifth position $X_{n-2}$). The length of sixth straight line portion 42 (direct distance between fourth position $X_{n-4}$ and fifth position $X_{n-2}$) may be larger than the length of seventh straight line portion 43 (direct distance between fifth position $X_{n-2}$, and sixth position $X_{n-3}$).

In the rotation direction, a distance (fourth distance b1) between second ridgeline 5 and fourth position $X_{n-1}$ may be the same as a distance (fifth distance b2) between fourth position $X_{n-1}$ and fifth position $X_{n-2}$. In the radial direction, the distance (fifth distance b2) between fourth position $X_{n-1}$ and fifth position $X_{n-2}$ may be the same as a distance (sixth distance b3) between fifth position $X_{n-2}$ and sixth position $X_{n-3}$.

Figures 15, 16:
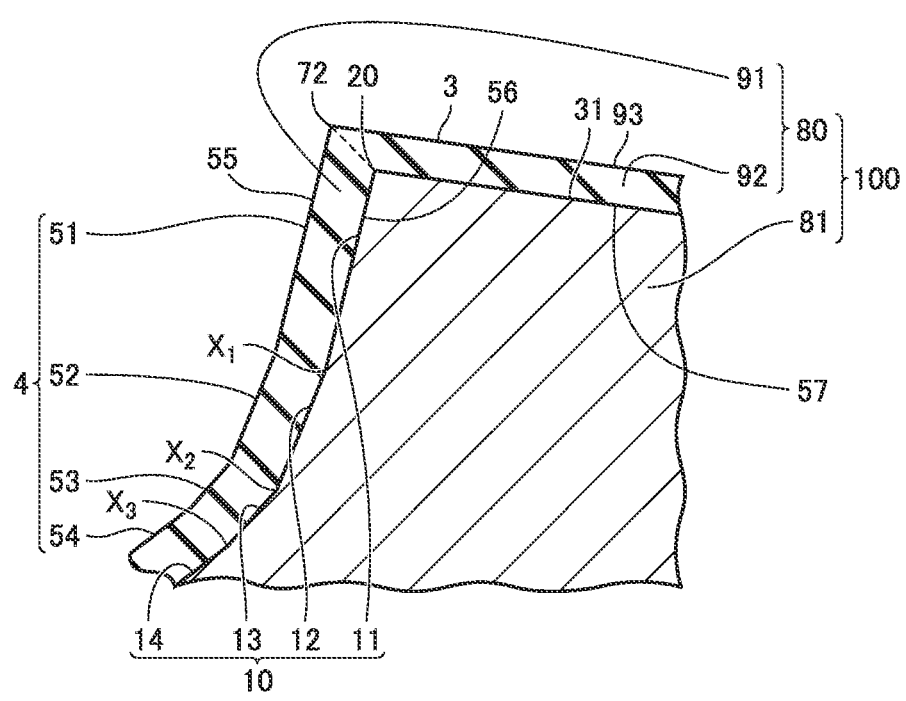
FIG. 15 is a diagram showing a relation between an angle formed by two adjacent straight line portions and a position in a peripheral direction.
FIG. 16 is a partial schematic cross sectional view showing the configuration of the cutting tool according to the fifth embodiment.

FIG. 15 is a diagram showing a relation between an angle formed by two adjacent straight line portions and a position in the peripheral direction. As shown in FIG. 15, in first surface 10, the angle formed by the two adjacent straight line portions may be monotonously decreased in a direction from first ridgeline 20 toward eighth surface 40. In the cross section perpendicular to axis line A, first surface 10 may be constituted of, for example, 5 or more straight line portions. Similarly, in eighth surface 40, the angle formed by the two adjacent straight line portions may be monotonously decreased in a direction from second ridgeline 5 toward first surface 10. In the cross section perpendicular to axis line A, eighth surface 40 may be constituted of, for example, 5 or more straight line portions. In the cross section perpendicular to axis line A, the surface of substrate 81 facing first chip discharging flute 1 may be constituted of a plurality of straight line portions.

The lower limit of the number of the straight line portions is not particularly limited, but may be, for example, 10 or more, or 20 or more. The upper limit of the 1.0 number of the straight line portions is not particularly limited, but may be, for example, 50 or less, or 40 or less.

As shown in FIG. 15, a difference (angle difference B) between the maximum value of the angle formed by the two adjacent straight line portions and the minimum value of the angle formed by the two adjacent straight line portions in first surface 10 is, for example, 8° or more. The lower limit of angle difference B is not particularly limited, but may be, for example, 10° or more, or 12° or more. The upper limit of angle difference B is not particularly limited, but may be, for example, 30° or less.

FIG. 16 is a partial schematic cross sectional view showing the configuration of cutting tool 100 according to the fifth embodiment. The region shown in FIG. 16 corresponds to region IV in FIG. 3.

As shown in FIG. 16, in the cross section perpendicular to axis line A, cutting tool 100 according to the fourth embodiment has a substrate 81, a first oxide film 91, and a second oxide film 92. First surface 10 faces rake face 4. First oxide film 91 has a second surface 56 and a third surface 55.

Second surface 56 is in contact with first surface 10. Third surface 55 is located opposite to second surface 56. Third surface 55 is rake face 4.

Substrate 81 has a fifth surface 31. Fifth surface 31 is contiguous to first surface 10. Fifth surface 31 faces flank face 3. Second oxide film 92 constitutes flank face 3. Second oxide film 92 has a sixth surface 57 in contact with fifth surface 31, and a seventh surface 93 located opposite to sixth surface 57. Seventh surface 93 is flank face 3.

As shown in FIG. 16, in the cross section perpendicular to axis line A, rake face 4 may be constituted of a plurality of straight line portions. Rake face 4 may have a ninth straight line portion 51, a tenth straight line portion 52, an eleventh straight line portion 53, and a twelfth straight line portion 54. Ninth straight line portion 51 faces first straight line portion 11. Tenth straight line portion 52 faces second straight line portion 12. Eleventh straight line portion 53 faces third straight line portion 13. Twelfth straight line portion 54 faces fourth straight line portion 14.

Ninth straight line portion 51 is contiguous to first flank face 3. Ninth straight line portion 51 is inclined with respect to first flank face 3. A boundary between ninth straight line portion 51 and first flank face 3 is outer peripheral cutting edge 72. Tenth straight line portion 52 is inclined with respect to ninth straight line portion 51. Tenth straight line portion 52 is contiguous to ninth straight line portion 51. Tenth straight line portion 52 is located opposite to first flank face 3 with respect to ninth straight line portion 51. From another viewpoint, it can be said that ninth straight line portion 51 is located between tenth straight line portion 52 and first flank face 3.

Eleventh straight line portion 53 is inclined with respect to tenth straight line portion 52. Eleventh straight line portion 53 is contiguous to tenth straight line portion 52. Eleventh straight line portion 53 is located opposite to ninth straight line portion 51 with respect to tenth straight line portion 52. From another viewpoint, it can be said that tenth straight line portion 52 is located between eleventh straight line portion 53 and ninth straight line portion 51. Twelfth straight line portion 54 is inclined with respect to eleventh straight line portion 53. Twelfth straight line portion 54 is contiguous to eleventh straight line portion 53. Twelfth straight line portion 54 is located opposite to tenth straight line portion 52 with respect to eleventh straight line portion 53. From another viewpoint, it can be said that eleventh straight line portion 53 is located between twelfth straight line portion 54 and tenth straight line portion 52.

Sixth Embodiment

Next, a configuration of a cutting tool 100 according to a sixth embodiment will be described. Cutting tool 100 according to the sixth embodiment is different from cutting tool 100 according to the fifth embodiment in terms of such a configuration that no second oxide film 92 is included, and is the same as cutting tool 100 according to the fifth embodiment in terms of the other configurations. Hereinafter, the configuration different from that of cutting tool 100 according to the fifth embodiment will be mainly described.

Figure 17:
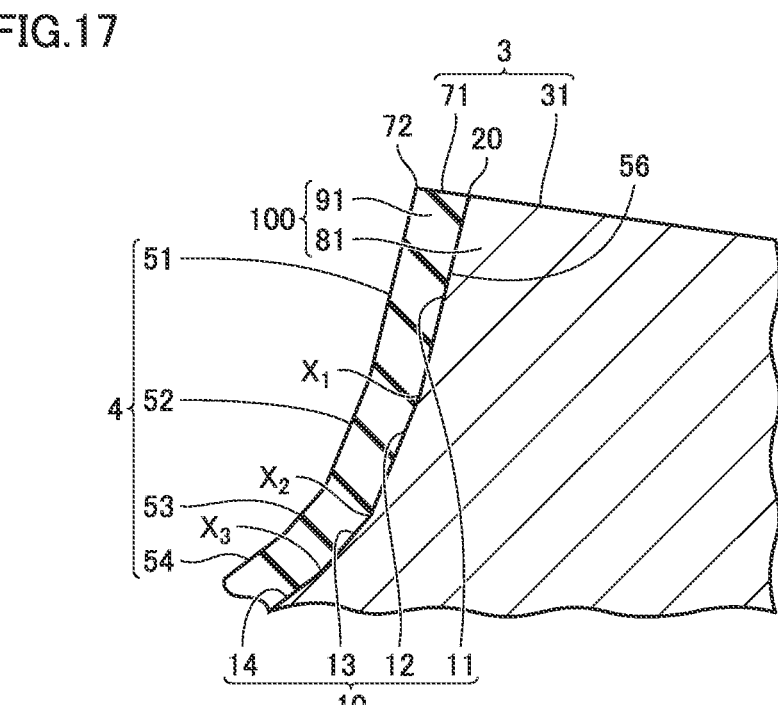
FIG. 17 is a partial schematic cross sectional view showing a configuration of a cutting tool according to a sixth embodiment.

FIG. 17 is a partial schematic cross sectional view showing the configuration of cutting tool 100 according to the sixth embodiment. The region shown in FIG. 17 corresponds to region IV in FIG. 3. As shown in FIG. 17, first oxide film 91 may further include a fourth surface 71 that connects second surface 56 to third surface 55. Fourth surface 71 of first oxide film 91 is provided along fifth surface 31 of substrate 81. A ridgeline between third surface 55 and fourth surface 71 constitutes outer peripheral cutting edge 72. No oxide film is formed on fifth surface 31. From another viewpoint, it can be said that fifth surface 31 of substrate 81 is exposed from first oxide film 91. Fourth surface 71 constitutes at least part of first flank face 3. First flank face 3 may include fourth surface 71 and fifth surface 31.

Seventh Embodiment

Next, a configuration of a cutting tool 100 according to a seventh embodiment will be described. Cutting tool 100 according to the seventh embodiment is different from cutting tool 100 according to the fifth embodiment in terms of such a configuration that first oxide film 91 is separated from second oxide film 92, and is the same as cutting tool 100 according to the fifth embodiment in terms of the other configurations. Hereinafter, the configuration different from that of cutting tool 100 according to the fifth embodiment will be mainly described.

Figure 18:
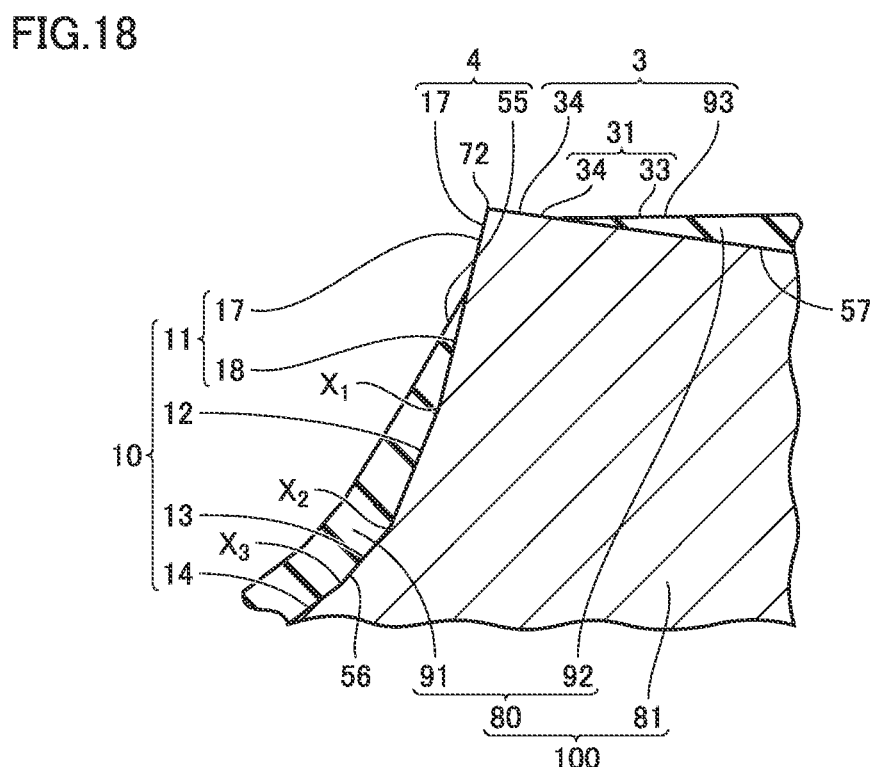
FIG. 18 is a partial schematic cross sectional view showing a configuration of a cutting tool according to a seventh embodiment.

FIG. 18 is a partial schematic cross sectional view showing the configuration of cutting tool 100 according to the seventh embodiment. The region shown in FIG. 18 corresponds to region IV in FIG. 3. As shown in FIG. 18, first oxide film 91 may be separated from second oxide film 92. Part of first surface 10 is exposed from first oxide film 91, First surface 10 has a first region 18 in contact with first oxide film 91, and a second region 17 contiguous to first region 18 and separated from first oxide film 91, Third surface 55 and second region 17 constitute rake face 4. Second region 17 may be part of first straight line portion 11.

Part of fifth surface 31 is exposed from second oxide film 92. Fifth surface 31 has a third region 33 in contact with second oxide film 92, and a fourth region 34 contiguous to third region 33 and separated from second oxide film 92. Second oxide film 92 has a sixth surface 57 in contact with fifth surface 31, and a seventh surface 93 located opposite to sixth surface 57. Seventh surface 93 and fourth region 34 constitute flank face 3. A ridgeline between second region 17 and fourth region 34 constitutes outer peripheral cutting edge 72. Second oxide film 92 may have a portion having a thickness that is increased in a direction further away from outer peripheral cutting edge 72.

In the above embodiment, cutting tool 100 is, for example, a rotary cutting tool 100, more specifically, a multi-edged rotary cutting tool 100. Cutting tool 100 is, for example, an end mill, but is not limited to the end mill. Cutting tool 100 may be, for example, a reamer, a drill, or a tap. Cutting tool 100 may be, for example, a turning tool. Cutting tool 100 may be a throwaway insert.

Next, functions and effects of cutting tool 100 according to the present embodiment will be described.

Figure 19:
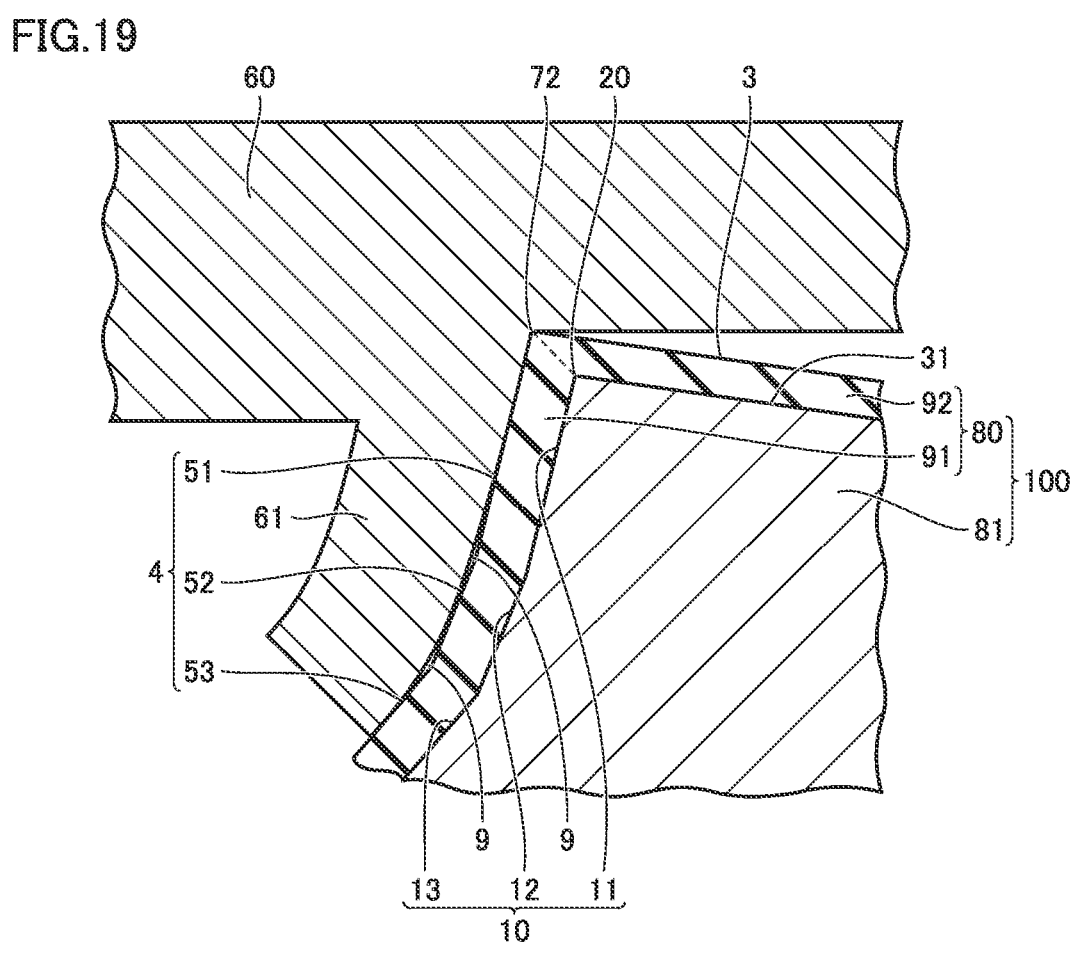

FIG. 19 is a schematic cross sectional view showing a state in which cutting is performed using cutting tool 100 according to the fifth embodiment. As shown in FIG. 19, chip 61 of a workpiece 60 resulting from cutting by cutting edge 72 of cutting tool 100 is discharged with chip 61 being in contact with rake face 4, When frictional force between chip 61 and rake face 4 is high, chip 61 may be melted and adhered to rake face 4. Cutting edge 72 may be broken due to the melting and adhesion of chip 61.

Cutting tool 100 according to the present disclosure includes: substrate 81 composed of a cubic boron nitride sintered material; and oxide layer 80 that covers substrate 81 and that constitutes part or whole of at least one of rake face 4, flank face 3, and cutting edge 72. Oxide layer 80 includes at least one element selected from a group consisting of titanium, aluminum, zirconium, and cobalt. The thickness of oxide layer 80 is 2 μm or less. Thus, wear resistance of substrate 81 can be improved. Therefore, the life of cutting tool 100 until breakage of cutting edge 72 can be extended.

According to cutting tool 100 of the present disclosure, the thickness of oxide layer 80 may be 30 nm or more and 300 nm or less. When the thickness of oxide layer 80 is too thin, the function of improving lubricity by oxide layer 80 cannot be sufficiently exhibited, thus resulting in decreased wear resistance of cutting tool 100. On the other hand, when the thickness of oxide layer 80 is too thick, oxide layer 80 is likely to be detached. When oxide layer 80 is detached from substrate 81, the cubic boron nitride sintered material is exposed, thus resulting in decreased wear resistance of cutting tool 100. By setting the thickness of oxide layer 80 to 30 nm or more and 300 nm or less, the wear resistance of cutting tool 100 can be suppressed from being decreased. Therefore, the life of cutting tool 100 until breakage of cutting edge 72 can be further extended.

According to cutting tool 100 of the present disclosure, when cutting region 22 is defined as a region sandwiched between first imaginary line 4*b* and second imaginary line 3*b*, the ratio of the area occupied by oxide layer 80 in cutting region 22 may be 20% or more and 80% or less, first imaginary line 4*b* being separated by 200 μm on rake face 4 from imaginary ridgeline D formed by intersection of the plane obtained by extending rake face 4 and the plane obtained by extending flank face 3, second imaginary line 3*b* being separated by 200 on flank face 3 from imaginary ridgeline D. When the ratio of the area occupied by oxide layer 80 in cutting region 22 is too small, the function of improving lubricity by oxide layer 80 cannot be sufficiently exhibited, thus resulting in decreased wear resistance of cutting tool 100. On the other hand, when the ratio of the area occupied by oxide layer 80 in cutting region 22 is too large, tensile stress in oxide layer 80 becomes large to collapse oxide layer 80, with the result that oxide layer 80 is likely to be detached. When oxide layer 80 is detached from substrate 81, the cubic boron nitride sintered material is exposed, thus resulting in decreased wear resistance of cutting tool 100. By setting the ratio of the area occupied by oxide layer 80 in cutting region 22 to 20% or more and 80% or less, the wear resistance of cutting tool 100 can be suppressed from being decreased. Therefore, the life of cutting tool 100 until breakage of cutting edge 72 can be further extended.

Further, according to cutting tool 100 of the present disclosure, first surface 10 of substrate 81 may be constituted of the plurality of straight line portions in the cross section perpendicular to axis line A, Specifically, in the cross section perpendicular to axis line A, first surface 10 may have first straight line portion 11, second straight line portion 12 inclined with respect to first straight line portion 11 and contiguous to first straight line portion 11, and third straight line portion 13 inclined with respect to second straight line portion 12 and contiguous to second straight line portion 12. When chip 61 is moved on rake face 4, chip 61 is curled at a certain curvature. Therefore, a clearance 9 is formed between curled chip 61 and a boundary between ninth straight line portion 51 facing first straight line portion 11 and tenth straight line portion 52 facing second straight line portion 12. Similarly, a clearance 9 is formed between curled chip 61 and a boundary between tenth straight line portion 52 facing second straight line portion 12 and eleventh straight line portion 53 facing third straight line portion 13. When cutting workpiece 60, coolant is drawn into clearances 9 by capillary action. This makes it possible to effectively transport and keep the coolant in the vicinity of the cutting point. As a result, frictional force between chip 61 and rake face 4 can be reduced. Therefore, cutting edge 72 can be suppressed from being broken.

Example 1

(Sample Preparation)

First, cutting tools 100 of samples 1-1 to 1-12 were prepared. Each of cutting tools 100 of samples 1-1 to 1-12 is an end mill. In the end mill, substrate 81 is brazed to the front end of the shank portion composed of a cemented carbide. Substrate 81 is composed of a cBN sintered material in cutting tool 100 of each of samples 1-1 to 1-11, oxide layer 80 is formed in cutting region 22 (see FIGS. 5 and 6). Oxide layer 80 is TiO. In cutting tool 100 of sample 1-12, no oxide layer 80 is formed in cutting region 22.

In cutting tool 100 of sample 1-1, the thickness of oxide layer 80 was set to 0.015 μm, and the ratio of the area occupied by oxide layer 80 in cutting region 22 was set to 30%. In cutting tool 100 of sample 1-2, the thickness of oxide layer 80 was set to 0.03 μm, and the ratio of the area occupied by oxide layer 80 in cutting region 22 was set to 48%. In cutting tool 100 of sample 1-3, the thickness of oxide layer 80 was set to 0.06 μm, and the ratio of the area occupied by oxide layer 80 in cutting region 22 was set to 50%. In cutting tool 100 of sample 1-4, the thickness of oxide layer 80 was set to 0.1 μm, and the ratio of the area occupied by oxide layer 80 in cutting region 22 was set to 56%. In cutting tool 100 of sample 1-5, the thickness of oxide layer 80 was set to 0.25 μm, and the ratio of the area occupied by oxide layer 80 in cutting region 22 was set to 64%. In cutting tool 100 of sample 1-6, the thickness of oxide layer 80 was set to 0.3 μm, and the ratio of the area occupied by oxide layer 80 in cutting region 22 was set to 68%.

In cutting tool 100 of sample 1-7, the thickness of oxide layer 80 was set to 0.7 μm, and the ratio of the area occupied by oxide layer 80 in cutting region 22 was set to 74%. In cutting tool 100 of sample 1-8, the thickness of oxide layer 80 was set to 0.03 μm, and the ratio of the area occupied by oxide layer 80 in cutting region 22 was set to 14%. In cutting tool 100 of sample 1-9, the thickness of oxide layer 80 was set to 0.03 μm, and the ratio of the area occupied by oxide layer 80 in cutting region 22 was set to 22%. In cutting tool 100 of sample 1-10, the thickness of oxide layer 80 was set to 0.27 μm, and the ratio of the area occupied by oxide layer 80 in cutting region 22 was set to 80%. In cutting tool 100 of sample 1-11, the thickness of oxide layer 80 was set to 0.26 μm, and the ratio of the area occupied by oxide layer 80 in cutting region 22 was set to 85%.

(Evaluation Method)

Next, workpiece 60 was processed using cutting tool 100 of each of samples 1-1 to 1-12. Workpiece 60 was SCM415. A cutting speed (Vc) was set to 300 mm/min. A feed amount (f) was set to 0.02 mm/t. An amount of cut (Ae) in the lateral direction was set to 0.2 mm. An amount of cut (Ap) in the axial direction was set to 3.0 mm. Coolant was a 20× diluted emulsion, (Evaluation Results)

TABLE 1

| Samples | Composition of Oxide Layer | Thickness of Oxide Layer (μm) | Area Ratio of Oxide Layer | Breakage Life (Min) |
|---|---|---|---|---|
| Sample 1-1 | TiO | 0.015 | 30% | 34 |
| Sample 1-2 | TiO | 0.03 | 48% | 62 |

TABLE 1-continued

| Samples | Composition of Oxide Layer | Thickness of Oxide Layer (μm) | Area Ratio of Oxide Layer | Breakage Life (Min) |
|---|---|---|---|---|
| Sample 1-3 | TiO | 0.06 | 50% | 72 |
| Sample 1-4 | TiO | 0.1 | 56% | 80 |
| Sample 1-5 | TiO | 0.25 | 64% | 68 |
| Sample 1-6 | TiO | 0.3 | 68% | 88 |
| Sample 1-7 | TiO | 0.7 | 74% | 36 |
| Sample 1-8 | TiO | 0.03 | 14% | 51 |
| Sample 1-9 | TiO | 0.03 | 22% | 60 |
| Sample 1-10 | TiO | 0.27 | 80% | 63 |
| Sample 1-11 | TiO | 0.26 | 85% | 51 |
| Sample 1-12 | None | — | — | 20 |

Table 1 shows a breakage life when workpiece 60 was processed using cutting tool 100 of each of samples 1-1 to 1-12. The breakage life is a period of time from start of processing to breakage of cutting edge 72. As shown in Table 1, when workpiece 60 was processed using cutting tool 100 of each of samples 1-1 to 1-11, the breakage life was 34 minutes or more and 88 minutes or less. On the other hand, when workpiece 60 was processed using cutting tool 100 of sample 1-12, the breakage life was 20 minutes. From the above results, it was proved that by providing oxide layer 80 in cutting region 22, the breakage life of cutting edge 72 was extended.

The breakage life when workpiece 60 was processed using cutting tool 100 of each of samples 1-2 to 1-6 was longer than the breakage life when workpiece 60 was processed using cutting tool 100 of each of samples 1-1 and 1-7. From the above results, it was proved that by setting the thickness of oxide layer 80 to 0.03 μm or more and 0.3 μm or less, the breakage life of cutting edge 72 is extended.

The breakage life when workpiece 60 was processed using cutting tool 100 of each of samples 1-2 and 1-9 was longer than the breakage life when workpiece 60 was processed using cutting tool 100 of sample 1-8. Oxide layers 80 of cutting tools 100 of samples 1-2, 1-8 and 1-9 have substantially the same thickness. From the above results, it was proved that by setting the ratio of the area occupied by oxide layer 80 in cutting region 22 to 20% or more, the breakage life of cutting edge 72 is extended.

The breakage life when workpiece 60 was processed using cutting tool 100 of each of samples 1-5 and 1-10 was longer than the breakage life when workpiece 60 was processed using cutting tool 100 of sample 1-11. Oxide layers 80 of cutting tools 100 of samples 1-5, 1-10 and 1-11 have substantially the same thickness. From the above results, it was proved that by setting the ratio of the area occupied by oxide layer 80 in cutting region 22 to 80% or less, the breakage life of cutting edge 72 is extended.

Example 2

(Sample Preparation)

Next, cutting tools 100 of samples 2-1 to 2-12 were prepared. Each of cutting tools 100 of samples 2-1 to 2-12 is an end mill. In the end mill, substrate 81 is brazed to the front end of the shank portion composed of a cemented carbide. Substrate 81 is composed of a cBN sintered material. In cutting tool 100 of each of samples 2-1 to 2-11, oxide layer 80 is formed in cutting region 22 (see FIGS. 5 and 6). Oxide layer 80 includes $Al_2O_3$, TiO, and TiBNO. In cutting tool 100 of sample 2-12, no oxide layer 80 is formed in cutting region 22.

In cutting tool 100 of sample 2-1, the thickness of oxide layer 80 was set to 0.016 μm, and the ratio of the area occupied by oxide layer 80 in cutting region 22 was set, to 32%. In cutting tool 100 of sample 2-2, the thickness of oxide layer 80 was set to 0.03 μm, and the ratio of the area occupied by oxide layer 80 in cutting region 22 was set to 50%. In cutting tool 100 of sample 2-3, the thickness of oxide layer 80 was set to 0.07 μm, and the ratio of the area occupied by oxide layer 80 in cutting region 22 was set to 45%. In cutting tool 100 of sample 2-4, the thickness of oxide layer 80 was set to 0.11 μm, and the ratio of the area occupied by oxide layer 80 in cutting region 22 was set to 53%. In cutting tool 100 of sample 2-5, the thickness of oxide layer 80 was set to 0.24 μm, and the ratio of the area occupied by oxide layer 80 in cutting region 22 was set to 58%. In cutting tool 100 of sample 2-6, the thickness of oxide layer 80 was set to 0.3 μm, and the ratio of the area occupied by oxide layer 80 in cutting region 22 was set to 62%.

In cutting tool 100 of sample 2-7, the thickness of oxide layer 80 was set to 0.6 μm, and the ratio of the area occupied by oxide layer 80 in cutting region 22 was set to 72%. In cutting tool 100 of sample 2-8, the thickness of oxide layer 80 was set to 0.03 μm, and the ratio of the area occupied by oxide layer 80 in cutting region 22 was set to 15%. In cutting tool 100 of sample 2-9, the thickness of oxide layer 80 was set to 0.03 μm, and the ratio of the area occupied by oxide layer 80 in cutting region 22 was set to 21%. In cutting tool 100 of sample 2-10, the thickness of oxide layer 80 was set to 0.25 μm, and the ratio of the area occupied by oxide layer 80 in cutting region 22 was set to 78%. In cutting tool 100 of sample 2-11, the thickness of oxide layer 80 was set to 0.25 μm, and the ratio of the area occupied by oxide layer 80 in cutting region 22 was set to 85%.

(Evaluation Method)

Next, workpiece 60 was processed using cutting tool 100 of each of samples 2-1 to 2-12. Workpiece 60 was SCM416. A cutting speed (Vc) was set to 300 mm/min. A feed amount (f) was set to 0.02 mm/t. An amount of cut (Ae) in the lateral direction was set to 0.2 mm. An amount of cut (Ap) in the axial direction was set to 3.0 mm. Coolant was a 20× diluted emulsion.

(Evaluation Results)

TABLE 2

| Samples | Composition of Oxide Layer | Thickness of Oxide Layer (μm) | Area Ratio of Oxide Layer | Breakage Life (Min) |
|---|---|---|---|---|
| Sample 2-1 | Al$_2$O$_3$, TiO, TiBNO | 0.016 | 32% | 55 |
| Sample 2-2 | Al$_2$O$_3$, TiO, TiBNO | 0.03 | 50% | 80 |
| Sample 2-3 | Al$_2$O$_3$, TiO, TiBNO | 0.07 | 45% | 95 |
| Sample 2-4 | Al$_2$O$_3$, TiO, TiBNO | 0.11 | 53% | 103 |
| Sample 2-5 | Al$_2$O$_3$, TiO, TiBNO | 0.24 | 58% | 84 |
| Sample 2-6 | Al$_2$O$_3$, TiO, TiBNO | 0.3 | 62% | 105 |
| Sample 2-7 | Al$_2$O$_3$, TiO, TiBNO | 0.6 | 72% | 52 |
| Sample 2-8 | Al$_2$O$_3$, TiO, TiBNO | 0.03 | 15% | 73 |
| Sample 2-9 | Al$_2$O$_3$, TiO, TiBNO | 0.03 | 21% | 84 |
| Sample 2-10 | Al$_2$O$_3$, TiO, TiBNO | 0.25 | 78% | 78 |
| Sample 2-11 | Al$_2$O$_3$, TiO, TiBNO | 0.25 | 85% | 43 |
| Sample 2-12 | None | — | — | 24 |

Table 2 shows a breakage life when workpiece 60 was processed using cutting tool 100 of each of samples 2-1 to 2-12. The breakage life is a period of time from start of processing to breakage of cutting edge 72. As shown in Table 2, when workpiece 60 was processed using cutting; tool 100 of each of samples 2-1 to 2-11, the breakage life was 43 minutes or more and 105 minutes or less. On the other hand, when workpiece 60 was processed using cutting tool 100 of sample 2-12, the breakage life was 24 minutes. From the above results, it was proved that by providing oxide layer 80 in cutting region 22, the breakage life of cutting edge 72 was extended.

The breakage life when workpiece 60 was processed using cutting tool 100 of each of samples 2-2 to 2-6 was longer than the breakage life when workpiece 60 was processed using cutting tool 100 of each of samples 2-1 and 2-7. From the above results, it was proved that by setting the thickness of oxide layer 80 to 0.03 μm or more and 0.3 μm or less, the breakage life of cutting edge 72 is extended.

The breakage life when workpiece 60 was processed using cutting tool 100 of each of samples 2-2 and 2-9 was longer than the breakage life when workpiece 60 was processed using cutting tool 100 of sample 2-8. Oxide layers 80 of cutting tools 100 of samples 2-2, 2-8 and 2-9 have substantially the same thickness, From the above results, it was proved that by setting the ratio of the area occupied by oxide layer 80 in cutting region 22 to 20% or more, the breakage life of cutting edge 72 is extended.

The breakage life when workpiece 60 was processed using cutting tool 100 of each of samples 2-5 and 2-10 was longer than the breakage life when workpiece 60 was processed using cutting tool 100 of sample 2-11. Oxide layers 80 of cutting tools 100 of samples 2-5, 2-10 and 2-11 have substantially the same thickness. From the above results, it was proved that by setting the ratio of the area occupied by oxide layer 80 in cutting region 22 to 80% or less, the breakage life of cutting edge 72 is extended.

Example 3

(Sample Preparation)

Next, cutting tools 100 of samples 3-1 to 3-12 were prepared. Each of cutting tools 100 of samples 3-1 to 3-12 is an end mill. In the end mill, substrate 81 is brazed to the front end of the shank portion composed of a cemented carbide. Substrate 81 is composed of a cBN sintered material. In cutting tool 100 of each of samples 3-1 to 3-11, oxide layer 80 is formed in cutting region 22 (see FIGS. 5 and 6). Oxide layer 80 includes Al$_2$O$_3$, ZrO, and AlBNO. In cutting tool 100 of sample 3-12, no oxide layer 80 is formed in cutting region 22.

In cutting tool 100 of sample 3-1, the thickness of oxide layer 80 was set to 0.015 μm, and the ratio of the area occupied by oxide layer 80 in cutting region 22 was set to 32%. In cutting tool 100 of sample 3-2, the thickness of oxide layer 80 was set to 0.03 μm, and the ratio of the area occupied by oxide layer 80 in cutting region 22 was set to 50%. In cutting tool 100 of sample 3-3, the thickness of oxide layer 80 was set to 0.06 μm, and the ratio of the area occupied by oxide layer 80 in cutting region 22 was set to 45%. In cutting tool 100 of sample 3-4, the thickness of oxide layer 80 was set to 0.11 μm, and the ratio of the area occupied by oxide layer 80 in cutting region 22 was set to 53%. In cutting tool 100 of sample 3-5, the thickness of oxide layer 80 was set to 0.26 μm, and the ratio of the area occupied by oxide layer 80 in cutting region 22 was set to 58%. In cutting tool 100 of sample 3-6, the thickness of oxide layer 80 was set to 0.3 μm, and the ratio of the area occupied by oxide layer 80 in cutting region 22 was set to 62%.

In cutting tool 100 of sample 3-7, the thickness of oxide layer 80 was set to 0.5 μm, and the ratio of the area occupied by oxide layer 80 in cutting region 22 was set to 72%. In cutting tool 100 of sample 3-8, the thickness of oxide layer 80 was set to 0.03 μm, and the ratio of the area occupied by oxide layer 80 in cutting region 22 was set to 16%. In cutting tool 100 of sample 3-9, the thickness of oxide layer 80 was set to 0.03 μm, and the ratio of the area occupied by oxide layer 80 in cutting region 22 was set to 22%. In cutting tool 100 of sample 3-10, the thickness of oxide layer 80 was set to 0.27 μm, and the ratio of the area occupied by oxide layer 80 in cutting region 22 was set to 78%. In cutting tool 100 of sample 3-11, the thickness of oxide layer 80 was set to 0.25 μm, and the ratio of the area occupied by oxide layer 80 in cutting region 22 was set to 85%.

(Evaluation Method)

Next, workpiece 60 was processed using cutting tool 100 of each of samples 3-1 to 3-12. Workpiece 60 was SCM415. A cutting speed (Vc) was set to 150 mm/min. A teed amount (f) was set to 0.03 mm/t. An amount of cut (Ae) in the lateral direction was set to 0.2 mm. An amount of cut (Ap) in the axial direction was set to 3.0 mm. Coolant was a 20× diluted emulsion, (Evaluation Results)

TABLE 3

| Samples | Composition of Oxide Layer | Thickness of Oxide Layer (μm) | Area Ratio of Oxide Layer | Breakage Life (Min) |
|---|---|---|---|---|
| Sample 3-1 | $Al_2O_3$, ZrO, AlBNO | 0.015 | 32% | 45 |
| Sample 3-2 | $Al_2O_3$, ZrO, AlBNO | 0.03 | 50% | 76 |
| Sample 3-3 | $Al_2O_3$, ZrO, AlBNO | 0.06 | 45% | 84 |
| Sample 3-4 | $Al_2O_3$, ZrO, AlBNO | 0.11 | 53% | 98 |
| Sample 3-5 | $Al_2O_3$, ZrO, AlBNO | 0.26 | 58% | 74 |
| Sample 3-6 | $Al_2O_3$, ZrO, AlBNO | 0.3 | 62% | 95 |
| Sample 3-7 | $Al_2O_3$, ZrO, AlBNO | 0.5 | 72% | 46 |
| Sample 3-8 | $Al_2O_3$, ZrO, AlBNO | 0.03 | 16% | 67 |
| Sample 3-9 | $Al_2O_3$, ZrO, AlBNO | 0.03 | 22% | 73 |
| Sample 3-10 | $Al_2O_3$, ZrO, AlBNO | 0.27 | 78% | 69 |
| Sample 3-11 | $Al_2O_3$, ZrO, AlBNO | 0.25 | 85% | 36 |
| Sample 3-12 | None | — | — | 17 |

Table 3 shows a breakage life when workpiece 60 was processed using cutting tool 100 of each of samples 3-1 to 3-12. The breakage life is a period of time from start of processing to breakage of cutting edge 72. As shown in Table 3, when workpiece 60 was processed using cutting; tool 100 of each of samples 3-1 to 3-11, the breakage life was 36 minutes or more and 98 minutes or less. On the other hand, when workpiece 60 was processed using cutting tool 100 of sample 3-12, the breakage life was 17 minutes. From the above results, it was proved that by providing oxide layer 80 in cutting region 22, the breakage life of cutting edge 72 was extended.

The breakage life when workpiece 60 was processed using cutting tool 100 of each of samples 3-2 to 3-6 was longer than the breakage life when workpiece 60 was processed using each of cutting tools 100 of samples 3-1 and 3-7. From the above results, it was proved that by setting the thickness of oxide layer 80 to 0.03 μm or more and 0.3 μm or less, the breakage life of cutting edge 72 is extended.

The breakage life when workpiece 60 was processed using cutting tool 100 of each of samples 3-2 and 3-9 was longer than the breakage life when workpiece 60 was processed using cutting tool 100 of sample 3-8. Oxide layers 80 of cutting tools 100 of samples 3-2, 3-8 and 3-9 have substantially the same thickness, From the above results, it was proved that by setting the ratio of the area occupied by oxide layer 80 in cutting region 22 to 20% or more, the breakage life of cutting edge 72 is extended.

The breakage life when workpiece 60 was processed using cutting tool 100 of each of samples 3-5 and 3-10 was longer than the breakage life when workpiece 60 was processed using cutting tool 100 of sample 3-11. Oxide layers 80 of cutting tools 100 of samples 3-5, 3-10 and 3-11 have substantially the same thickness. From the above results, it was proved that by setting the ratio of the area occupied by oxide layer 80 in cutting region 22 to 80% or less, the breakage life of cutting edge 72 is extended.

Example 4

(Sample Preparation)

Next, cutting tools 100 of samples 4-1 to 4-12 were prepared. Each of cutting tools 100 of samples 4-1 to 4-12 is an end mill. In the end mill, substrate 81 is brazed to the front end of the shank portion composed of a cemented carbide. Substrate 81 is composed of a cBN sintered material. In cutting tool 100 of each of samples 4-1 to 4-11, oxide layer 80 is formed in cutting region 22 (see FIGS. 5 and 6). Oxide layer 80 includes CoO and CoWBO. In cutting tool 100 of sample 4-12, no oxide layer 80 is formed in cutting region 22.

In cutting tool 100 of sample 4-1, the thickness of oxide layer 80 was set to 0.013 μm, and the ratio of the area occupied by oxide layer 80 in cutting region 22 was set to 32%. In cutting tool 100 of sample 4-2, the thickness of oxide layer 80 was set to 0.03 μm, and the ratio of the area occupied by oxide layer 80 in cutting region 22 was set to 50%. In cutting tool 100 of sample 4-3, the thickness of oxide layer 80 was set to 0.06 μm, and the ratio of the area occupied by oxide layer 80 in cutting region 22 was set to 45%. In cutting tool 100 of sample 4-4, the thickness of oxide layer 80 was set to 0.11 μm, and the ratio of the area occupied by oxide layer 80 in cutting region 22 was set to 53%. In cutting tool 100 of sample 4-5, the thickness of oxide layer 80 was set to 0.25 μm, and the ratio of the area occupied by oxide layer 80 in cutting region 22 was set to 58%. In cutting tool 100 of sample 4-6, the thickness of oxide layer 80 was set to 0.3 μm, and the ratio of the area occupied by oxide layer 80 in cutting region 22 was set to 62%.

In cutting tool 100 of sample 4-7, the thickness of oxide layer 80 was set to 0.5 μm, and the ratio of the area occupied by oxide layer 80 in cutting region 22 was set to 72%. In cutting tool 100 of sample 4-8, the thickness of oxide layer 80 was set to 0.03 μm, and the ratio of the area occupied by oxide layer 80 in cutting region 22 was set to 16%. In cutting tool 100 of sample 4-9, the thickness of oxide layer 80 was set to 0.03 μm, and the ratio of the area occupied by oxide layer 80 in cutting region 22 was set to 22%. In cutting tool 100 of sample 4-10, the thickness of oxide layer 80 was set to 0.26 μm, and the ratio of the area occupied by oxide layer 80 in cutting region 22 was set to 78%. In cutting tool 100 of sample 4-11, the thickness of oxide layer 80 was set to 0.26 μm, and the ratio of the area occupied by oxide layer 80 in cutting region 22 was set to 85%.

(Evaluation Method)

Next, workpiece 60 was processed using cutting tool 100 of each of samples 4-1 to 4-12. Workpiece 60 was Ti-6Al-4V. A cutting speed (Vc) was set to 800 mm/min, A teed amount (f) was set to 0.02 mm/t. An amount of cut (Ae) in the lateral direction was set to 0.2 mm. An amount of cut (Ap) in the axial direction was set to 0.5 mm. Coolant was a 20× diluted emulsion, (Evaluation Results)

TABLE 4

| Samples | Composition of Oxide Layer | Thickness of Oxide Layer (μm) | Area Ratio of Oxide Layer | Breakage Life (Min) |
|---|---|---|---|---|
| Sample 4-1 | CoO, CoWBO | 0.013 | 32% | 29 |
| Sample 4-2 | CoO, CoWBO | 0.03 | 50% | 55 |
| Sample 4-3 | CoO, CoWBO | 0.06 | 45% | 55 |
| Sample 4-4 | CoO, CoWBO | 0.11 | 53% | 70 |
| Sample 4-5 | CoO, CoWBO | 0.25 | 58% | 54 |
| Sample 4-6 | CoO, CoWBO | 0.3 | 62% | 68 |
| Sample 4-7 | CoO, CoWBO | 0.5 | 72% | 30 |
| Sample 4-8 | CoO, CoWBO | 0.03 | 16% | 48 |
| Sample 4-9 | CoO, CoWBO | 0.03 | 22% | 50 |
| Sample 4-10 | CoO, CoWBO | 0.26 | 78% | 49 |
| Sample 4-11 | CoO, CoWBO | 0.26 | 85% | 23 |
| Sample 4-12 | None | — | — | 12 |

Table 4 shows a breakage life when workpiece 60 was processed using cutting tool 100 of each of samples 4-1 to 4-12. The breakage life is a period of time from start of processing to breakage of cutting edge 72. As shown in Table 3, when workpiece 60 was processed using cutting; tool 100 of each of samples 4-1 to 4-11, the breakage life was 23 minutes or more and 70 minutes or less. On the other hand, when workpiece 60 was processed using cutting tool 100 of sample 4-12, the breakage life was 12 minutes. From the above results, it was proved that by providing oxide 1.0 layer 80 in cutting region 22, the breakage life of cutting edge 72 was extended.

The breakage life when workpiece 60 was processed using cutting tool 100 of each of samples 4-2 to 4-6 was longer than the breakage life when workpiece 60 was processed using each of cutting tools 100 of samples 4-1 and 4-7. From the above results, it was proved that by setting the thickness of oxide layer 80 to 0.03 μm or more and 0.3 μm or less, the breakage life of cutting edge 72 is extended.

The breakage life when workpiece 60 was processed using cutting tool 100 of each of samples 4-2 and 4-9 was longer than the breakage life when workpiece 60 was processed using cutting tool 100 of sample 4-8. Oxide layers 80 of cutting tools 100 of samples 4-2, 4-8 and 4-9 have substantially the same thickness, From the above results, it was proved that by setting the ratio of the area occupied by oxide layer 80 in cutting region 22 to 20% or more, the breakage life of cutting edge 72 is extended.

The breakage life when workpiece 60 was processed using cutting tool 100 of each of samples 4-5 and 4-10 was longer than the breakage life when workpiece 60 was processed using cutting tool 100 of sample 4-11. Oxide layers 80 of cutting tools 100 of samples 4-5, 4-10 and 4-11 have substantially the same thickness. From the above results, it was proved that by setting the ratio of the area occupied by oxide layer 80 in cutting region 22 to 80% or less, the breakage life of cutting edge 72 is extended.

Example 5

(Sample Preparation)

First, cutting tools 100 of samples 5-1 to 5-6 were prepared. In cutting tool 100 of each of samples 5-1 to 5-6, substrate 81 is brazed to the front end of the shank portion composed of a cemented carbide. Substrate 81 is composed of a cBN sintered material. In cutting tool 100 of each of samples 5-1 to 5-5, the oxide film is formed in substrate 81. In cutting tool 100 of sample 5-6, no oxide film is formed in substrate 81.

In cutting tool 100 of sample 5-1, the thickness of first oxide film 91 that constitutes first rake face 4 was set to 5 μm. The thickness of second oxide film 92 that constitutes first flank face 3 was set to 8 μm. Substrate 81 is coated with first oxide film 91 and second oxide film 92 through PVD (see FIG. 16). Each of first oxide film 91 and second oxide film 92 has a layered structure of $Al_2O_3$ and $TiO_2$.

In cutting tool 100 of sample 5-2, the thickness of first oxide film 91 that constitutes first rake face 4 was set to 2 μm. The thickness of second oxide film 92 that constitutes first flank face 3 was set to 1 urn. First oxide film 91 and second oxide film 92 are formed by performing surface treatment onto substrate 81 using laser so as to oxidize an element included in substrate 81 (see FIG. 16). Each of first oxide film 91 and second oxide film 92 includes $Al_2O_3$ and $TiO_2$.

In cutting tool 100 of sample 5-3, the thickness of first oxide film 91 that constitutes first rake face 4 was set to 2 μm. The thickness of second oxide film 92 that constitutes first flank face 3 was set to 0.5 μm. First oxide film 91 and second oxide film 92 are formed by performing surface treatment onto substrate 81 using laser so as to oxidize an element included in substrate 81 (see FIG. 16). Each of first oxide film 91 and second oxide film 92 includes $Al_2O_3$, $TiO_2$, and CoO.

In cutting tool 100 of sample 5-4, the thickness of first oxide film 91 that constitutes first rake face 4 was set to 2 urn. The thickness of second oxide film 92 that constitutes first flank face 3 was set to 0 μm. First oxide film 91 was formed by performing surface treatment onto substrate 81 using laser so as to oxidize an element included in substrate 81 (see FIG. 17). First oxide film 91 includes $Al_2O_3$, $TiO_2$, and CoO.

In cutting tool 100 of sample 5-5, the thickness of first oxide film 91 that constitutes first rake face 4 was set to 2 μm. The thickness of second oxide film 92 that constitutes first flank face 3 was set to 0 μm. First oxide film 91 was formed by performing surface treatment onto substrate 81 using laser so as to oxidize an element included in substrate 81 (see FIG. 17). First oxide film 91 includes $TiO_2$, CoO, and $W_2O_3$.

(Evaluation Method)

Next, workpiece 60 was processed using cutting tool 100 of each of samples 5-1 to 5-6 (see FIG. 19). Workpiece 60 was Ti-6Al-4V. A cutting speed (Vc) was set to 500 mm/min. A feed amount (f) was set to 0.015 mm/t. An amount of cut (Ae) in the lateral direction was set to 0.05 mm. An amount of cut (Ap) in the axial direction was set to 0.5 mm. Coolant was a 20× diluted emulsion.

(Evaluation Results)

TABLE 5

| Samples | Thickness of First Oxide Film (μm) | Thickness of Second Oxide Film (μm) | Composition of Oxide Film | Oxide Film Formation Method | Breakage Life |
|---|---|---|---|---|---|
| Sample 5-1 | 5 | 8 | $Al_2O_3$, $TiO_2$ | Coating | 18 Min. |
| Sample 5-2 | 2 | 1 | $Al_2O_3$, $TiO_2$ | Laser | 29 Min. |
| Sample 5-3 | 2 | 0.5 | $Al_2O_3$, $TiO_2$, CoO | Laser | 27 Min. |

TABLE 5-continued

| Samples | Thickness of First Oxide Film (μm) | Thickness of Second Oxide Film (μm) | Composition of Oxide Film | Oxide Film Formation Method | Breakage Life |
|---------|---------|---------|---------|---------|---------|
| Sample 5-4 | 2 | 0 | Al$_2$O$_3$, TiO$_2$, CoO | Laser | 23 Min. |
| Sample 5-5 | 2 | 0 | TiO$_2$, CoO, W$_2$O$_3$ | Laser | 22 Min. |
| Sample 5-6 | 0 | 0 | — | — | 9 Min. |

Table 5 shows a breakage life when workpiece 60 was processed using cutting tool 100 of each of samples 5-1 to 5-6. The breakage life is a period of time from start of processing to breakage of cutting edge 72. As shown in Table 5, the tool life when workpiece 60 was processed using cutting tool 100 of each of samples 5-1 to 5-5 was 18 minutes or more and 29 minutes or less. On the other hand, the tool life when workpiece 60 was processed using cutting tool 100 of sample 5-6 was 9 minutes. From the above results, it was proved that breakage of cutting edge 72 can be suppressed by rake face 4 being constituted of first oxide film 91 in the cross section perpendicular to axis line A.

The breakage life when workpiece 60 was processed using cutting tool 100 of each of samples 5-2 to 5-5 was longer than the breakage life when workpiece 60 was processed using cutting tool 100 of sample 5-1. From the above results, it was proved that by setting the thickness of the first oxide film to 2 μm or less, the breakage life of cutting edge 72 was extended.

CLAUSES

The above description includes features additionally noted below.

(Clause 1) A cutting tool 100 according to the present disclosure includes a rake face 4, a flank face 3, a substrate 81, and a first oxide film 91. Flank face 3 is contiguous to rake face 4. Substrate Si has a first surface 10 facing rake face 4. First oxide film 91 has a second surface 56 in contact with first surface 10, and a third surface 55 located opposite to second surface 56. A ridgeline between rake face 4 and flank face 3 constitutes a cutting edge 72. Third surface 55 constitutes at least part of rake face 4.

(Clause 2) In cutting tool 100 according to (Clause 1), first oxide film 91 may further include a fourth surface 71 that connects second surface 56 to third surface 55. Fourth surface 71 may constitute at least part of flank face 3. A ridgeline between third surface 55 and fourth surface 71 may constitute cutting edge 72.

(Clause 3) In cutting tool 100 according to (Clause 1) or (Clause 2), first oxide film 91 may include at least one of aluminum, titanium, chromium, zirconium, cobalt, and tungsten.

(Clause 4) Cutting tool 100 according to (Clause 1) may further include a second oxide film 92 that constitutes at least part of flank face 3. A thickness of second oxide film 92 may be smaller than a thickness of first oxide film 91.

(Clause 5) In cutting tool 100 according to (Clause 4), first oxide film 91 may be contiguous to second oxide film 92.

(Clause 6) In cutting tool 100 according to (Clause 4), first oxide film 91 may be separated from second oxide film 92.

(Clause 7) In cutting tool 100 according to any one of (Clause 4) to (Clause 6), first oxide film 91 may include at least one of aluminum, titanium, chromium, zirconium, cobalt, and tungsten.

(Clause 8) In cutting tool 100 according to any one of (Clause 4) to (Clause 7), second oxide film 92 may include at least one of aluminum, titanium, chromium, zirconium, cobalt, and tungsten.

(Clause 9) In cutting tool 100 according to any one of (Clause 1) to (Clause 8), substrate 81 may include cubic boron nitride.

(Clause 10) In cutting tool 100 according to any one of (Clause 1) to (Clause 9), cutting tool 100 may be a multi-edged rotary cutting tool 100.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: first chip discharging flute; 2: second chip discharging flute; 3: flank face (first flank face); 3a: second cutting region portion; 3b: second imaginary line; 4: rake face (first rake face); 4a: first cutting region portion; 4b: first imaginary line; 5: second ridgeline; 6: tail portion; 7: shank portion; 8: joining portion; 9: clearance; 10: first surface; 11: first straight line portion; 12: second straight line portion; 13: third straight line portion; 14: fourth straight line portion; 15: second rake face; 17: second region; 18: first region; 20: first ridgeline; 21: bottom cutting edge; 22: cutting region; 23: cubic boron nitride grain; 25: binder; 25a: first binder portion; 25b: second binder portion; 30: second flank face; 31: fifth surface; 33: third region; 34: fourth region; 40: eighth surface; 41: fifth straight line portion; 42: sixth straight line portion; 43: seventh straight line portion; 44: eighth straight line portion; 45: second chip discharging surface; 50: first chip discharging surface; 51: ninth straight line portion; 52: tenth straight line portion; 53: eleventh straight line portion; 54: twelfth straight line portion; 55: third surface; 56: second surface; 57: sixth surface; 58: front end; 59: rear end; 60: workpiece; 61: chip; 71: fourth surface; 72: cutting edge (outer peripheral cutting edge); 80: oxide layer; Si: substrate; 90: cutting edge portion; 91: first oxide film; 92: second oxide film; 93: seventh surface; 100: cutting tool; A: axis line; B: angle difference; C1: first extension plane; C2: second extension plane; D: imaginary ridgeline; L1: first length; L2: second length; R: rotation direction; $X_1$: first position; $X_2$: second position; $X_3$: third position; $X_{n-1}$: fourth position; $X_{n-2}$: fifth position; $X_{n-3}$: sixth position; a1: first distance; a2: second distance; a3: third distance; b1: fourth distance; b2: fifth distance; b3: sixth distance; $\theta_1$: first angle; $\theta_2$: second angle; $\theta_3$: third angle; $\theta_{n-1}$: fourth angle; $\theta_{n-2}$: fifth angle; $\theta_{n-3}$: sixth angle.

The invention claimed is:

1. A cutting tool comprising:

a rake face;

a flank face; and a cutting edge located between the rake face and the flank face, wherein the cutting tool includes a substrate composed of a cubic boron nitride sintered material, and an oxide layer that covers the substrate and that constitutes part or whole of at least one of the rake face, the flank face, and the cutting edge, the oxide layer consists of one or more oxides that include at least one element selected from a group consisting of titanium, aluminum, zirconium and cobalt, a thickness of the oxide layer is 30 nm or more and 300 nm or less, the substrate includes cubic boron nitride grains and a binder in contact with the cubic boron nitride grains, the oxide layer is contiguous to the binder, and the oxide layer includes the same element as an element included in the binder.

2. The cutting tool according to claim 1, wherein when a cutting region is defined as a region sandwiched between a first imaginary line and a second imaginary line, a ratio of an area occupied by the oxide layer in the cutting region is 20% or more and 80% or less, the first imaginary line being separated by 200 μm on the rake face from an imaginary ridgeline formed by intersection of a plane obtained by extending the rake face and a plane obtained by extending the flank face, the second imaginary line being separated by 200 μm on the flank face from the imaginary ridgeline.

3. The cutting tool according to claim 1, wherein part of the cubic boron nitride grains is exposed from the oxide layer.

4. The cutting tool according to claim 2, wherein part of the cubic boron nitride grains is exposed from the oxide layer.

5. A cutting tool comprising:

a rake face;

a flank face; and a cutting edge located between the rake face and the flank face, wherein the cutting tool includes a substrate composed of a cubic boron nitride sintered material, and an oxide layer that covers the substrate and that constitutes only part or whole of a surface of at least one of the rake face, the flank face, and the cutting edge, the oxide layer includes at least one element selected from a group consisting of titanium, aluminum, zirconium and cobalt, a thickness of the oxide layer is 2 μm or less, the substrate includes cubic boron nitride grains and a binder in contact with the cubic boron nitride grains, the oxide layer is contiguous to the binder, and the oxide layer includes the same element as an element included in the binder.

6. The cutting tool according to claim 5, wherein the thickness of the oxide layer is 30 nm or more and 300 nm or less.

7. The cutting tool according to claim 5, wherein when a cutting region is defined as a region sandwiched between a first imaginary line and a second imaginary line, a ratio of an area occupied by the oxide layer in the cutting region is 20% or more and 80% or less, the first imaginary line being separated by 200 μm on the rake face from an imaginary ridgeline formed by intersection of a plane obtained by extending the rake face and a plane obtained by extending the flank face, the second imaginary line being separated by 200 μm on the flank face from the imaginary ridgeline.

8. The cutting tool according to claim 5, wherein part of the cubic boron nitride grains is exposed from the oxide layer.

9. The cutting tool according to claim 6, wherein when a cutting region is defined as a region sandwiched between a first imaginary line and a second imaginary line, a ratio of an area occupied by the oxide layer in the cutting region is 20% or more and 80% or less, the first imaginary line being separated by 200 μm on the rake face from an imaginary ridgeline formed by intersection of a plane obtained by extending the rake face and a plane obtained by extending the flank face, the second imaginary line being separated by 200 μm on the flank face from the imaginary ridgeline.

10. The cutting tool according to claim 6, wherein part of the cubic boron nitride grains is exposed from the oxide layer.

11. The cutting tool according to claim 7, wherein part of the cubic boron nitride grains is exposed from the oxide layer.

* * * * *